(12) United States Patent
Yavuz et al.

(10) Patent No.: US 11,284,288 B2
(45) Date of Patent: Mar. 22, 2022

(54) METHOD AND APPARATUS FOR MICROSLICING WIRELESS COMMUNICATION NETWORKS WITH DEVICE GROUPS, SERVICE LEVEL OBJECTIVES, AND LOAD/ADMISSION CONTROL

(71) Applicant: Celona, Inc., Cupertino, CA (US)

(72) Inventors: Mehmet Yavuz, Palo Alto, CA (US);
Rajeev Shah, Cupertino, CA (US);
Vinay Anneboina, Cupertino, CA (US);
Andrew Von Nagy, Cupertino, CA (US); Keshav Sai Nanduri, Cupertino, CA (US)

(73) Assignee: Celona, Inc., Cupertino, CA (US)

( * ) Notice: Subject to any disclaimer, the term of this patent is extended or adjusted under 35 U.S.C. 154(b) by 41 days.

(21) Appl. No.: 16/790,645

(22) Filed: Feb. 13, 2020

(65) Prior Publication Data

US 2021/0204164 A1 Jul. 1, 2021

Related U.S. Application Data

(60) Provisional application No. 62/956,066, filed on Dec. 31, 2019.

(51) Int. Cl.
*H04W 28/02* (2009.01)
*H04W 28/10* (2009.01)
(Continued)

(52) U.S. Cl.
CPC ....... *H04W 28/0268* (2013.01); *H04W 28/10* (2013.01); *H04W 72/087* (2013.01); *H04W 76/10* (2018.02)

(58) Field of Classification Search
CPC . H04W 28/0268; H04W 28/10; H04W 76/12; H04W 76/10; H04W 28/0263; H04W 72/087; H04W 48/18
See application file for complete search history.

(56) References Cited

U.S. PATENT DOCUMENTS

2007/0011262 A1* 1/2007 Kitani ............... H04L 63/02
709/213
2016/0212017 A1* 7/2016 Li ..................... H04L 41/12
(Continued)

*Primary Examiner* — Ricardo H Castaneyra
(74) *Attorney, Agent, or Firm* — Jaquez Land Greenhaus & McFarland LLP; Bruce W. Greenhaus, Esq.

(57) ABSTRACT

A method and apparatus for defining and administering microslices by a network administrator in an enterprise network is described. Microslices provide an end-to-end logical network through multiple networks, which allows a network administrator to efficiently arrange data flows in the enterprise network with a defined Quality of Service (QoS). Various embodiments of a system for creating and implementing microslices in a wireless communications network, such as a 4G LTE or 5G network are disclosed. In some embodiments the logical network connects a UE in the enterprise network with an external server through at least a Radio Access Network (RAN) and a Core Network. In some embodiments, the network administrator can define groups of UEs, define a plurality of service types, and specify an amount of network resources to be allocated to the microslice. After a microslice instance is set up, network operation can be monitored and modified.

16 Claims, 20 Drawing Sheets

(51) Int. Cl.
*H04W 72/08* (2009.01)
*H04W 76/10* (2018.01)

(56) References Cited

U.S. PATENT DOCUMENTS

| | | | |
|---|---|---|---|
| 2017/0367036 A1* | 12/2017 | Chen | H04L 43/08 |
| 2018/0152958 A1* | 5/2018 | Arnold | H04L 41/5025 |
| 2018/0270743 A1* | 9/2018 | Callard | H04L 45/64 |
| 2019/0124704 A1* | 4/2019 | Sun | H04W 76/10 |
| 2020/0136920 A1* | 4/2020 | Doshi | H04L 41/16 |
| 2020/0178158 A1* | 6/2020 | Won | H04W 48/06 |
| 2021/0084523 A1* | 3/2021 | Kucera | H04L 41/0896 |

* cited by examiner

Standardized QCI characteristics

| QCI | Resource Type | Priority | Packet Delay Budget | Packet Error Loss Rate | Example Services |
|---|---|---|---|---|---|
| 1 (Note 3) | GBR | 2 | 100 ms | $10^{-2}$ | Conversational Voice |
| 2 (Note 3) | GBR | 4 | 150 ms | $10^{-3}$ | Conversational Video (Live Streaming) |
| 3 (Note 3) | GBR | 3 | 50 ms | $10^{-3}$ | Real Time Gaming |
| 4 (Note 3) | GBR | 5 | 300 ms | $10^{-6}$ | Non-Conversational Video (Buffered Streaming) |
| 5 (Note 3) | Non-GBR | 1 | 100 ms | $10^{-6}$ | IMS Signalling |
| 6 (Note 4) | Non-GBR | 6 | 300 ms | $10^{-6}$ | Video (Buffered Streaming) TCP-based (e.g., www, e-mail, chat, ftp, p2p file sharing, progressive video, etc.) |
| 7 (Note 3) | Non-GBR | 7 | 100 ms | $10^{-3}$ | Voice, Video (Live Streaming) Interactive Gaming |
| 8 (Note 5) | Non-GBR | 8 | 300 ms | $10^{-6}$ | Video (Buffered Streaming) TCP-based (e.g., www, e-mail, chat, ftp, p2p file sharing, progressive video, etc.) |
| 9 (Note 6) | Non-GBR | 9 | 300 ms | $10^{-6}$ | Video (Buffered Streaming) TCP-based (e.g., www, e-mail, chat, ftp, p2p file sharing, progressive video, etc.) |

*FIG. 1D*
*(PRIOR ART)*

| Example Microslice Definition |||
|---|---|---|
| Field Name | Value Example | Field Description |
| Microslice name | Streaming | A descriptive name to identify the purpose of this microslice |
| Allowed application definitions | Specify a list | List of applications that will be mapped to this microslice |
| Min. guaranteed throughput | 100Mbps | Minimum throughput guaranteed for each device |
| Max allowed throughput | 200Mbps | Maximum throughput cap on the device |
| MPDB (Maximum Packet Delay Budget) | 20ms | Maximum latency for any packet flowing through this slice |
| MPLR (Maximum Packet Loss Rate) | $10^{-e3}$ | Maximum packet loss rate for any flow through this slice |
| Priority | 1 | This will dictate preemption in case of congestion in the RAN. Values 1-15 are allowed. Lower number indicates critical priority. |

*FIG. 4*

| Example Allowed Application Definitions |||
|---|---|---|
| Permit All |||
| Application1 | Dest IP | 1.1.1.1 |
| | Dest Port | 123 |
| | Src Port | 6500 |
| | Protocol type | TCP |
| | DSCP | TOS field 0xb8 |
| Application 2 | Dest IP | 2.2.2.2 |
| | Dest port | 456 |
| | Protocol Type | UDP |

*FIG. 5*

| Example Device Group Definition |||
|---|---|---|
| Field Name | Value Example | Field Description |
| Device group name | Security | All the handhelds and smartphones assigned to the security organization |
| Admin | Joe | Administrator for this device group |
| Trusted | YES/NO | Trust device request for microslice access |
| VLAN or VxLAN ID | 333 | Broadcast domain for devices in this device group |
| DHCP | x.x.x.x/y | DHCP server address for this device group |

*FIG. 7*

| Example Microslice Assignment to Device Groups |||||
|---|---|---|---|---|
| Microslice Name | Streaming | IP Camera | Video Conf | Default (Internet) |
| Device Group 1 | X | | X | X |
| Device Group 2 | | X | | X |
| Default Group | | | | X |

*FIG. 8*

METHOD AND APPARATUS FOR MICROSLICING WIRELESS COMMUNICATION NETWORKS WITH DEVICE GROUPS, SERVICE LEVEL OBJECTIVES, AND LOAD/ADMISSION CONTROL

CROSS-REFERENCE TO RELATED APPLICATIONS—CLAIM OF PRIORITY

The present application claims priority to U.S. Provisional Application No. 62/956,066, filed Dec. 31, 2019, entitled "Method and Apparatus for Microslicing Wireless Communication Networks with Device Groups, Service Level Objectives, and Load/Admission Control", which is herein incorporated by reference in its entirety.

BACKGROUND

Technical Field

The disclosed method and apparatus relate to wireless communications networks and more particularly to methods and apparatus for slicing the network to allow network administrators and businesses and other enterprises to more closely tailor network access with communication needs, and provide a way to more efficiently use network resources.

Background

The wireless industry has experienced tremendous growth in recent years. Wireless technology is rapidly improving, and faster and more numerous broadband communication networks have been installed around the globe. These networks have now become key components of a worldwide communication system that connects people and businesses at speeds and on a scale unimaginable just a couple of decades ago. The rapid growth of wireless communication is a result of increasing demand for more bandwidth and services. This rapid growth is in many ways supported by standards. For example, 4G LTE has been widely deployed over the past years, and the next generation system, and 5G NR (New Radio) is now being deployed. In these wireless systems, multiple mobile devices are served voice services, data services, and many other services over wireless connections so they may remain mobile while still connected.

FIG. 1 is an illustration of a basic configuration for a communication network, such as a "4G LTE" (fourth generation Long-Term Evolution) or "5G NR" (fifth generation New Radio) network. Through this network configuration, user equipment (UE) 101a and 101b can connect to External Packet Data Networks (PDNs) 103 and access any of a variety of services such as the Internet, Application Servers, Data Services, Voice Services, and others.

The UEs 101a and 101b connect wirelessly over respective communication links 105a and 105b to a Radio Access Network (RAN) 107 that includes a base station/access point (BS/AP) 109. One of the advantages of such networks is their ability to provide communications to and from multiple wireless devices and provide these wireless devices with access to a large number of other devices and services even though the devices may be mobile and moving from location to location.

UE

As used herein, the term "UE' refers to a wide range of user devices having wireless connectivity, such as a cellular mobile phone, an Internet of Things (IOT) device, virtual reality goggles, robotic devices, autonomous driving machines, smart barcode scanners, and communications equipment including for example cell phones, desktop computers, laptop computers, tablets and other types of personal communications devices. In some cases, the UEs may be mobile; in other cases they may be installed at a fixed location. For example, a factory sensor may be installed at a fixed location from which it can remotely monitor an assembly line or a robotic arm's movement.

BS/AP

The term 'BS/AP" is used broadly herein to include base stations and access points, including at least an evolved NodeB (eNB) of an LTE network or gNodeB of a 5G network, a cellular base station (BS), a Citizens Broadband Radio Service Device (CBSD) (which e.g. may be an LTE or 5G device), a WiFi access node, a Local Area Network (LAN) access point, a Wide Area Network (WAN) access point, and should also be understood to include other network receiving hubs that provide access to a network of a plurality of wireless transceivers within range of the BS/AP. Typically, the BS/APs are used as transceiver hubs, whereas the UEs are used for point-to-point communication and are not used as hubs. Therefore, the BS/APs transmit at a relatively higher power than the UEs.

Core Network

The RAN 107 connects the UEs 101 with the Core Network 111. One function of the Core Network 111 is to provide control of wireless signaling between the UEs 101 and the RAN 107. Another function of the Core Network 111 is to provide access to other devices and services either within its network, or on other networks such as the External PDNs 103. Particularly, in cellular networks and in private networks, the BS/AP 109 can receive wireless signals from, and send wireless signals to, the UEs 101. The RAN 107 is coupled to the core network 111; therefore, the RAN 107 and the Core Network 111 provide a system that allows information to flow between a UE in the cellular or private network and other networks, such as the Public Switched Telephone Network (PSTN) or the Internet. Wireless data transmission between a UE 101 and the BS/AP 109 occurs on an assigned channel, such as a specific frequency. Data transmission between the BS/AP 109 and the Core Network 111 utilizes any appropriate communication means, such as wireless, cable, and fiber optic.

In addition to providing access to remote networks and allowing information to flow between the cellular network and the external PDNs 103, the Core Network 111 provides control of the air interface between the BS/AP 119 and the UEs 101. The Core Network 111 may also coordinate the BS/APs 109 to minimize interference within the network.

Network Slicing

In mobile communication networks such as 4G LTE (LTE) and 5G NR (5G) networks, it is desirable to tailor connectivity and data processing to specific requirements of various applications run by the mobile devices. By tailoring connectivity and data processing to specific requirements, a greater efficiency and productivity of business communication processes can be achieved and furthermore, opportunities open up for service providers to address different business segments and enterprises more effectively. For this purpose, network slicing was introduced for LTE/5G networks. In 5G, network slicing is a network architecture that enables the multiplexing of virtualized and independent logical networks on the same physical network infrastructure. Each network slice is an isolated end-to-end network tailored to fulfil diverse requirements requested by a particular application.

The GSM Association (GSMA) is a telecommunications industry group involved in 5G. A publication entitled "Network Slicing Use Case Requirements", dated Apr. 18, 2018, discusses network slicing. From a mobile operator's point of view, a network slice is an independent end-to-end logical network that runs on a shared physical infrastructure, capable of providing an agreed service quality. The technology that enables network slicing is transparent to business customers for whom LTE/5G networks, and in combination with network slicing, allows connectivity and data processing tailored to specific business requirements. The customizable network capabilities include data speed, quality, latency, reliability, security, and services. These capabilities may be provided based on a Service Level Agreement (SLA) between the mobile operator and the business customer.

A network slice may span across multiple parts of the network (e.g. access network, core network and transport network) and could be deployed across multiple operators. A network slice may utilize dedicated and/or shared resources, (e.g. in terms of processing power, storage, and bandwidth), and each network slice is effectively isolated from the other network slices.

It is anticipated that mobile network operators could deploy a single network slice type that satisfies the needs of multiple verticals, as well as multiple network slices of different types that are packaged as a single product targeted towards business customers (a business bundle) who have multiple and diverse requirements. For example, a vehicle may need simultaneously a high bandwidth slice for infotainment and an ultra-reliable slice for telemetry-assisted driving.

In summary, a network slice is a logical network that provides specific network capabilities and network characteristics in order to serve a defined business purpose of a customer. Network slicing allows multiple virtual networks to be created on top of a common shared physical infrastructure. A network slice consists of different subnets, example: Radio Access Network (RAN) subnet, Core Network (CN) subnet, Transport network subnet.

A Network Slicing Provider is typically a telecommunication service provider who is the owner or tenant of the network infrastructures from which network slices are created. The Network Slicing provider takes the responsibilities of managing and orchestrating corresponding resources that the Network Slicing consists of. A Business Customer tenants the network slice, e.g. customers from vertical industries. For instance, business customers could be enterprise or specialized industry customers (often referred to as "verticals").

Various technologies and innovations from different technical domains have substantially contributed to the Network Slicing progress in different Standards Developing Organizations (SDO). Currently, technical specifications for those different technical domains are defined in corresponding SDOs. For example, Radio Access Network (RAN) and Core Network (CN) are defined by 3GPP, Transport Network (TN) is defined by BBF, IETF, and others. ITUT (GSTR TN5G), IEEE (NGFI 1914), MEF and other SDOs are working on this topic as well.

For example, the 3GPP (3$^{rd}$ Generation Partnership Project) TS 23.501 Release 16, v16.2.0 (2019-09) specification includes particular aspects of network slicing. Details are specified in 3GPP 23.501 section 5.15. The UE device may provide Network Slice Selection Assistance Information (NSSAI) parameters to the network to help the network select a RAN and a Core Network part of a Network Slice Instance (NSI) for the device. A single NSSAI may lead to the selection of several slices. The network may also use device capabilities, subscription information and local operator policies to do the selection.

Network slices may differ for supported features and network functions optimizations, in which case such Network Slices may have e.g. different S-NSSAIs with different Slice/Service Types (SSTs) (see 3GPP TS 23.501 section 5.15.2.1). The operator can deploy multiple network slices delivering exactly the same features but for different groups of UEs, e.g. as they deliver a different committed service and/or because they are dedicated to a customer, in which case such Network Slices may have e.g. different S-NSSAIs with the same Slice/Service Type but different Slice Differentiators (see TS 23.501 section 5.15.2.1).

The network may serve a single UE with one or more Network Slice instances simultaneously via a 5G Access Network (5G-AN) regardless of the access type(s) over which the UE is registered (e.g. 3GPP Access and/or Non-3Gpp (N3GPP Access). The Access and Mobility management Function (AMF) instance serving the UE logically belongs to each of the network slice instances serving the UE, i.e. this AMF instance is common to the Network Slice instances serving a UE.

Although the standard discusses a basic architecture for network slicing, it is limited and provides no particular mechanism for defining and administering network slices, and typically network slices as defined in the standards would be defined and administered by the large telecommunications companies that serve large numbers of customers, which would keep prices high, and reduce the pace of adoption by relatively smaller enterprises. Accordingly, there is presently a desire for a network slicing mechanism that is more flexible, more efficient, and more easily implemented and administered. Such a mechanism would simplify administration, allow more control, save time, allow remote administration, and make better use of limited bandwidth. It would also be an advantage to monitor the network slicing mechanism as it is operating and to modify the operations, to provide greater efficiency, and to meet network functionality, business goals, and demands.

LTE Bearers: LTE (4G) Architecture

The following sections discuss bearers as defined in 4G LTE, Rel. 10 standards. In general, a bearer provides and uniquely identifies traffic flows that receive a common QoS treatment between two endpoints. For example, the bearer may be defined between a UE and a PDN GW (P-GW), or between a UE and a Serving GW (S-GW).

(1) LTE Bearers: Quality of Service:

Bearers in LTE can be classified into two categories based on the nature of the QoS they provide: minimum guaranteed bit rate (GBR) bearers and non-GBR bearers.

Minimum guaranteed bit rate (GBR) bearers can be used for applications such as VoIP. These have an associated GBR value for which dedicated transmission resources are permanently allocated (for example, by an admission control function in the eNodeB) at bearer establishment or modification. Bit rates higher than the GBR may be allowed for a GBR bearer if resources are available. In such cases, a maximum bit rate (MBR) parameter, which can also be associated with a GBR bearer, sets an upper limit on the bit rate that can be expected from a GBR bearer.

Non-GBR bearers do not guarantee any particular bit rate. These can be used for applications such as web browsing or FTP transfer. For these bearers, no bandwidth resources are allocated permanently to the bearer. The following sections are based on 3GPP Technical Specifications as noted, discussing bearers and QoS handling for different bearers.

LTE Bearers: 3GPP 36.300-13.2 QoS Parameters

The bearer level (i.e. per bearer or per bearer aggregate) QoS parameters are QCI, ARP, GBR, and AMBR. Each EPS Radio Access Bearer (E-RAB) (both GBR and Non-GBR) is associated with the following bearer level QoS parameters:

QoS Class Identifier (QCI): a scalar that is used as a reference to access node-specific parameters that control bearer level packet forwarding treatment (e.g. scheduling weights, admission thresholds, queue management thresholds, link layer protocol configuration, etc.), and that have been pre-configured by the operator owning the eNodeB. A one-to-one mapping of standardized QCI values to standardized characteristics is captured in 3GPP TS 23.401.

Allocation and Retention Priority (ARP): the primary purpose of ARP is to decide whether a bearer establishment/modification request can be accepted or needs to be rejected in case of resource limitations. In addition, the ARP can be used by the eNodeB to decide which bearer(s) to drop during exceptional resource limitations (e.g. at handover).

Each GBR bearer is additionally associated with the following bearer level QoS parameters:—Guaranteed Bit Rate (GBR): the bit rate that can be expected to be provided by a GBR bearer, Maximum Bit Rate (MBR): the maximum bit rate that can be expected to be provided by a GBR bearer. MBR can be greater or equal to the GBR.

Each APN access, by a UE or other device, is associated with the following QoS parameter:

per APN Aggregate Maximum Bit Rate (APN-AMBR).

Aggregate Maximum Bit Rate (AMBR) is the maximum possible bit rate configured by the LTE operator for a particular LTE user for all of their best effort services. The key word here is "possible". This is the maximum possible if bandwidth is available and also dependent on what and how many services the user is using. It is a configured value by the LTE operator and does not change.

LTE data bearers that are classified as Non-GBR are scheduled according to the AMBR for the subscriber. This means that the total radio resources available to all the Non GBR bearers that a subscriber has active cannot exceed the AMBR.

Each UE in state EMM-REGISTERED is associated with the following bearer aggregate level QoS parameters:

per UE Aggregate Maximum Bit Rate (UE-AMBR).

The definitions of APN-AMBR and UE-AMBR are captured in [23.401].

The GBR and MBR denotes bit rate of traffic per bearer while UE-AMBR/APN-AMBR denote bit rate of traffic per group of bearers. Each of those QoS parameters has an uplink and a downlink component.

LTE Bearers: 3GPP 23.203-6.1.7

The service level QoS parameters are QCI, ARP, GBR, and MBR.

Each Service Data Flow (SDF) is associated with one and only one QoS Class Identifier (QCI). For the same IP-CAN session multiple SDFs with the same QCI and ARP can be treated as a single traffic aggregate which is referred to as an SDF aggregate. An SDF is a special case of an SDF aggregate. The QCI is scalar that is used as a reference to node specific parameters that control packet forwarding treatment (e.g. scheduling weights, admission thresholds, queue management thresholds, link layer protocol configuration, etc.) and that have been pre-configured by the operator owning the node (e.g. eNodeB).

LTE Bearers: Standardized QCI Characteristics

Reference is now made to FIGS. 1B and 1C. FIG. 1B is a diagram showing the scope of the Standardized QCI characteristics for client/server architectures. FIG. 1C is a diagram showing the scope of the Standardized QCI characteristics for and peer/peer communication.

This section specifies standardized characteristics associated with standardized QCI values. The characteristics describe the packet forwarding treatment that an SDF aggregate receives edge-to-edge between the UE and the PCEF (see FIGS. 1B and 1C) in terms of the following performance characteristics:

| | |
|---|---|
| 1 | Resource Type (GBR or Non-GBR); |
| 2 | Priority; |
| 3 | Packet Delay Budget; and |
| 4 | Packet Error Loss Rate. |

The standardized characteristics are not signaled on any interface. They should be understood as guidelines for the pre-configuration of node specific parameters for each QCI. The goal of standardizing a QCI with corresponding characteristics is to ensure that applications/services mapped to that QCI receive the same minimum level of QoS in multi-vendor network deployments and in case of roaming. A standardized QCI and its corresponding characteristics are independent of the UE's current access (3GPP or Non-3GPP).

Reference is now made to FIG. 1D, which is a table that illustrates the one-to-one mapping of standardized QCI values to standardized characteristics.

The Resource Type determines if dedicated network resources related to a service or bearer level Guaranteed Bit Rate (GBR) value are permanently allocated (e.g. by an admission control function in a radio base station). GBR SDF aggregates are therefore typically authorized "on demand" which requires dynamic policy and charging control. A Non GBR SDF aggregate may be pre-authorized through static policy and charging control.

The Packet Delay Budget (PDB) defines an upper bound for the time that a packet may be delayed between the UE and the PCEF. For a certain QCI the value of the PDB is the same in uplink and downlink. The purpose of the PDB is to support the configuration of scheduling and link layer functions (e.g. the setting of scheduling priority weights and HARQ target operating points). The PDB shall be interpreted as a maximum delay with a confidence level of 98 percent.

The PDB denotes a "soft upper bound" in the sense that an "expired" packet, e.g. a link layer SDU that has exceeded the PDB, does not need to be discarded (e.g. by RLC in E-UTRAN). The discarding (dropping) of packets is expected to be controlled by a queue management function, e.g. based on pre-configured dropping thresholds.

Following is the NOTE 1 referenced in the PDB column of FIG. 1D. "NOTE 1: A delay of 20 ms for the delay between a PCEF and a radio base station should be subtracted from a given PDB to derive the packet delay budget that applies to the radio interface. This delay is the average between the case where the PCEF is located "close" to the radio base station (roughly 10 ms) and the case where the PCEF is located "far" from the radio base station, e.g. in case of roaming with home routed traffic (the one-way packet delay between Europe and the US west coast is roughly 50 ms). The average takes into account that roaming is a less typical scenario. It is expected that subtracting this average delay of 20 ms from a given PDB will lead to desired end-to-end performance in most typical cases. Also, note that the PDB defines an upper bound. Actual packet delays—in particular for GBR traffic—should typically be lower than the PDB specified for a QCI as long as the UE has sufficient radio channel quality."

The support for SRVCC requires QCI=1 only be used for IMS speech sessions in accordance to TS 23.216.

Services using a Non-GBR QCI should be prepared to experience congestion related packet drops, and 98 percent of the packets that have not been dropped due to congestion should not experience a delay exceeding the QCI's PDB. This may for example occur during traffic load peaks or when the UE becomes coverage limited. See Annex J for details. Packets that have not been dropped due to congestion may still be subject to non-congestion related packet losses (see PELR below).

Services using a GBR QCI and sending at a rate smaller than or equal to GBR can in general assume that congestion related packet drops will not occur, and 98 percent of the packets shall not experience a delay exceeding the QCI's PDB. Exceptions (e.g. transient link outages) can always occur in a radio access system which may then lead to congestion related packet drops even for services using a GBR QCI and sending at a rate smaller than or equal to GBR. Packets that have not been dropped due to congestion may still be subject to non-congestion related packet losses (see PELR below).

Every QCI (GBR and Non-GBR) is associated with a Priority level. Priority level 1 is the highest Priority level. The Priority levels shall be used to differentiate between SDF aggregates of the same UE, and it shall also be used to differentiate between SDF aggregates from different UEs. Via its QCI an SDF aggregate is associated with a Priority level and a PDB. Scheduling between different SDF aggregates shall primarily be based on the PDB. If the target set by the PDB can no longer be met for one or more SDF aggregate(s) across all UEs that have sufficient radio channel quality then Priority shall be used as follows: in this case a scheduler shall meet the PDB of an SDF aggregate on Priority level N in preference to meeting the PDB of SDF aggregates on Priority level N+1 until the priority N SDF aggregate's GBR (in case of a GBR SDF aggregate) has been satisfied. Other aspects related to the treatment of traffic exceeding an SDF aggregate's GBR are out of scope of this specification.

Following is NOTE 3, which is referenced in FIG. 1D for Priorities 1-5, and 7. "NOTE 3: This QCI is typically associated with an operator controlled service, i.e., a service where the SDF aggregate's uplink/downlink packet filters are known at the point in time when the SDF aggregate is authorized. In case of E-UTRAN this is the point in time when a corresponding dedicated EPS bearer is established/modified."

Following is NOTE 4, which is referenced in FIG. 1D for Priority 6. "NOTE 4: If the network supports Multimedia Priority Services (MPS) then this QCI could be used for the prioritization of non real-time data (i.e. most typically TCP-based services/applications) of MPS subscribers."

Following is NOTE 5, which is referenced in FIG. 1D for Priority 8. "NOTE 5: This QCI could be used for a dedicated "premium bearer" (e.g. associated with premium content) for any subscriber/subscriber group. Also in this case, the SDF aggregate's uplink/downlink packet filters are known at the point in time when the SDF aggregate is authorized. Alternatively, this QCI could be used for the default bearer of a UE/PDN for "premium subscribers"."

Following is NOTE 6, which is referenced in FIG. 1D for Priority 9. "NOTE 6: This QCI is typically used for the default bearer of a UE/PDN for non privileged subscribers. Note that AMBR can be used as a "tool" to provide subscriber differentiation between subscriber groups connected to the same PDN with the same QCI on the default bearer."

The definition (or quantification) of "sufficient radio channel quality" is out of the scope of 3GPP specifications.

In case of E-UTRAN a QCI's Priority level may be used as the basis for assigning the uplink priority per Radio Bearer (see TS 36.300 [19] for details).

The Packet Error Loss Rate (PELR) defines an upper bound for the rate of SDUs (e.g. IP packets) that have been processed by the sender of a link layer protocol (e.g. RLC in E-UTRAN) but that are not successfully delivered by the corresponding receiver to the upper layer (e.g. PDCP in E-UTRAN). Thus, the PELR defines an upper bound for a rate of non-congestion related packet losses. The purpose of the PELR is to allow for appropriate link layer protocol configurations (e.g. RLC and HARQ in E-UTRAN). For a certain QCI the value of the PELR is the same in uplink and downlink.

Following is the NOTE 2 referenced in the PELR column of FIG. 1D. "NOTE 2: The rate of non congestion related packet losses that may occur between a radio base station and a PCEF should be regarded to be negligible. A PELR value specified for a standardized QCI therefore applies completely to the radio interface between a UE and radio base station."

The characteristics PDB and PELR are specified only based on application/service level requirements, i.e., those characteristics should be regarded as being access agnostic, independent from the roaming scenario (roaming or non-roaming), and independent from operator policies.

LTE Bearers: Allocation and Retention Priority (ARP) Characteristics

The QoS parameter Allocation and Retention Priority (ARP) contains information about the priority level, the pre-emption capability and the pre-emption vulnerability. The priority level defines the relative importance of a resource request. This allows deciding whether a bearer establishment or modification request can be accepted or needs to be rejected in case of resource limitations (typically used for admission control of GBR traffic). It can also be used to decide which existing bearers to pre-empt during resource limitations.

The range of the ARP priority level is 1 to 15 with 1 as the highest level of priority. The pre-emption capability information defines whether a service data flow can get resources that were already assigned to another service data flow with a lower priority level. The pre-emption vulnerability information defines whether a service data flow can lose the resources assigned to it in order to admit a service data flow with higher priority level. The pre-emption capability and the pre-emption vulnerability can be either set to 'yes' or 'no'.

The ARP priority levels 1-8 should only be assigned to resources for services that are authorized to receive prioritized treatment within an operator domain (i.e. that are authorized by the serving network). The ARP priority levels 9-15 may be assigned to resources that are authorized by the home network and thus applicable when a UE is roaming. Note this ensures that future releases may use ARP priority levels 1-8 to indicate e.g. emergency and other priority services within an operator domain in a backward compatible manner. This does not prevent the use of ARP priority levels 1-8 in roaming situation in case appropriate roaming agreements exist that ensure a compatible use of these priority levels.

LTE Bearers: Description

An EPS Bearer is a pipeline through which data traffic flows within an EPS (Evolved Packet switched System).

Referring now to FIG. 1E, an EPS Bearer is illustrated as the path from the UE, through the eNodeB and SGW, and terminating in the PGW.

Referring to FIG. 1F, an EPS bearer may include several bearers within it.

In LTE, both the 'Radio Bearer' part and 'Core Network Bearer' are configured by a single message: 'RRC Connection Reconfiguration'. Within 'RRC Connection Reconfiguration' message there is one part for Radio configuration and another part for Core Network configuration.

There are two types of EPS Bearers. One is 'Default EPS Bearer' and the other one is 'Dedicated EPS Bearer'. Default EPS Bearers are established during Attach Process. Usually the default EPS bearer does not have specific QoS (only Nominal QoS is applied). A dedicated EPS Bearer is normally established during the call or after idle mode. It is linked to a specified default EPS bearer and may have a specific (usually guaranteed) QoS.

In a typical case, multiple applications may be running in a UE at any time, each one having different quality of service requirements. For example, a UE can be engaged in a VoIP call while at the same time browsing a web page or downloading an FTP file. VoIP has more stringent requirements for QoS in terms of delay and delay jitter than web browsing and FTP, while the latter requires a much lower packet loss rate. In order to support multiple QoS requirements, different bearers are set up within the Evolved Packet System, each being associated with a QoS.

LTE Bearers: Default Bearer Establishment and Setting up QoS Parameters

FIG. 1G, which is a diagram of UL and DL service data flows (SDFs) in the Application/Service layer, shows that an EPS bearer has to cross multiple interfaces: the S5/S8 interface from the P-GW to the S-GW, the S1 interface from the S-GW to the eNodeB, and the radio interface (also known as the "LTE-Uu interface") from the eNodeB to the UE. Across each interface, the EPS bearer is mapped onto a lower layer bearer, each with its own bearer identity. Each node must keep track of the binding between the bearer IDs across its different interfaces.

An S5/S8 bearer transports the packets of an EPS bearer between a P-GW and an S-GW. The S-GW stores a one-to-one mapping between an S1 bearer and an S5/S8 bearer. The bearer is identified by the GTP tunnel ID across both interfaces.

The packets of an EPS bearer are transported by an S1 bearer between an S-GW and an eNodeB, and by a radio bearer between a UE and an eNodeB. An eNodeB stores a one-to-one mapping between a radio bearer ID and an S1 bearer to create the mapping between the two.

IP packets mapped to the same EPS bearer receive the same bearer-level packet forwarding treatment (for example, scheduling policy, queue management policy, rate shaping policy, RLC configuration). In order to provide different bearer-level QoS, a separate EPS bearer must therefore be established for each QoS flow. User IP packets must then be filtered into the appropriate EPS bearers.

Packet filtering into different bearers is based on Traffic Flow Templates (TFTs). The TFTs use IP header information such as source and destination IP addresses and Transmission Control Protocol (TCP) port numbers to filter packets such as VoIP from web-browsing traffic, so that each can be sent down the respective bearers with appropriate QoS. An Uplink TFT (UL TFT) associated with each bearer in the UE filters IP packets to EPS bearers in the uplink direction. A Downlink TFT (DL TFT) in the P-GW is a similar set of downlink packet filters.

As part of the procedure by which a UE attaches to the network, the UE is assigned an IP address by the P-GW and at least one bearer is established. This is called the default bearer, and it remains established throughout the lifetime of the PDN connection in order to provide the UE with always-on IP connectivity to that PDN. The initial bearer-level QoS parameter values of the default bearer are assigned by the MME, based on subscription data retrieved from the HSS. The PCEF may change these values in interaction with the Policy and Charging Rules Function (PCRF) or according to local configuration. Additional bearers called dedicated bearers can also be established at any time during or after completion of the attach procedure.

A dedicated bearer can be either a GBR or a non-GBR bearer (the default bearer always has to be a non-GBR bearer since it is permanently established). The distinction between default and dedicated bearers should be transparent to the access network (for example, E-UTRAN). Each bearer has an associated QoS, and if more than one bearer is established for a given UE, then each bearer must also be associated with appropriate TFTs. These dedicated bearers could be established by the network, based for example on a trigger from the IMS domain, or they could be requested by the UE. The dedicated bearers for a UE may be provided by one or more P-GWs.

The bearer-level QoS parameter values for dedicated bearers are received by the P-GW from the PCRF and forwarded to the S-GW. The MME only transparently forwards those values received from the S-GW over the S11 reference point to the E-UTRAN.

QoS parameters are defined for the UE during the initial context setup procedure. MME sends an Initial Context Setup Request message to eNodeB. This allows eNodeB to configure itself for the new E-RAB.

Referring to FIG. 1H, in the Initial Context Setup Request message, the following parameters are defined for the QoS profile:

| | |
|---|---|
| 1. | UE-AMBR |
| 2. | E-RAB Level QoS Parameters |
| 3. | QCI |
| 4. | ARP |
| 5. | GBR |
| 6. | MBR |

LTE Bearers: Dedicated Bearer Establishment and Setting up QoS Parameters

A dedicated bearer is required if the end-user requires a different QoS to that offered by the default bearer, or if the end-user requires connectivity to a different PDN to that provided by the default bearer. Dedicated bearers are configured to run in parallel to existing default bearer.

The dedicated bearer establishment procedure is initiated by the network but may be requested by the UE. The UE can request a dedicated bearer by sending a NAS Bearer Resource Allocation Request to the MME.

FIG. 1I is a message flow diagram that shows a typical end-to-end bearer establishment procedure across the network nodes, using the functionality described in the above sections. When a bearer is established, the bearers across each of the interfaces discussed above are established.

The PCRF sends a Policy Control and Charging (PCC) Decision Provision message indicating the required QoS for the bearer to the P-GW. The P-GW uses this QoS policy to assign the bearer-level QoS parameters. The P-GW then sends a Create Dedicated Bearer Request message including the QoS and UL TFT to be used in the UE to the S-GW. After the S-GW receives the Create Dedicated Bearer Request message, including bearer QoS, UL TFT and S1-bearer ID, it forwards it to the MME (message 3 in FIG. 1I).

The MME then builds a set of session management configuration information including the UL TFT and the EPS bearer identity and includes it in the Bearer Setup Request message that it sends to the eNodeB (message 4 in FIG. 1I). Since the session management configuration is NAS information, it is sent transparently by the eNodeB to the UE.

The Bearer Setup Request also provides the QoS of the bearer to the eNodeB; this information is used by the eNodeB for call admission control and also to ensure the necessary QoS by appropriate scheduling of the user's IP packets. The eNodeB maps the EPS bearer QoS to the radio bearer QoS and then signals an RRC Connection Reconfiguration message (including the radio bearer QoS, session management request and EPS radio bearer identity) to the UE to setup the radio bearer (message 5 in FIG. 1I). The RRC Connection Reconfiguration message contains all the configuration parameters for the radio interface. These are mainly for the configuration of the layer 2 (the PDCP, RLC and MAC parameters), but also contain the layer 1 parameters required for the UE to initialize the protocol stack.

Messages 6 to 10 in FIG. 1I are the corresponding response messages to confirm that the bearers have been correctly set up.

The Home Subscription Server (HSS) is a database that contains users' SAE (System Architecture Evolution) subscription data such as the EPS-subscribed QoS profile and any access restrictions for roaming. It also holds information about the PDNs to which the user can connect. This could be in the form of an Access Point Name (APN) (which is a label according to DNS naming conventions describing the access point to the PDN) or a PDN address (indicating subscribed IP address(es)).

The PDN Gateway is responsible for IP address allocation for the UE, as well as QoS enforcement and flow-based charging according to rules from the PCRF. It is responsible for the filtering of downlink user IP packets into the different QoS-based bearers. This is performed based on Traffic Flow Templates (TFTs). The P-GW performs QoS enforcement for guaranteed bit rate (GBR) bearers.

SUMMARY

Enterprises have been moving towards digital solutions and this includes optimization of compute, storage and networking infrastructure for optimal performance of their business applications. Enterprises prefer to use LTE/5G networks because they provide a wireless network infrastructure with high reliability that meets their specific requirements. However, their specific needs may go beyond the standard network slices concept defined by the Standard Development Organizations (SDOs), which would typically be defined, installed, and administered by large telecommunication companies. Enterprises need a way to flexibly create and manage network slices, and it would be advantageous if the systems can be administered by IT professionals, which would reduce costs and increase the pace of adoption of the technology. Furthermore, it would be advantageous for the microslices to provide a more efficient network.

In order to assist enterprises to more cost effectively and efficiently operate their enterprise networks, microslices are described herein. Microslices can be used for example to provide an end-to-end logical network through multiple networks, and ensure that certain Quality of Service (QoS) and Service Level Objective (SLO) requirements are met for different service types or applications. From an overall viewpoint, embodiments that use microslicing as described herein take a more granular approach to network slicing for enterprise LTE/5G deployments than the standard-based network slicing approach, which allows greater customization of services, faster updates, and simplifies administration. Also, this more granular approach provides users and the enterprise with more efficient use of bandwidth and better service for the UEs.

Various embodiments of a system for creating and implementing microslices in a wireless communications network are disclosed.

In one embodiment, a microslice is defined by a network administrator of an enterprise network. Advantageously, microslices can be utilized to efficiently arrange data flows in the enterprise network and provide an end-to-end Quality of Service (QoS) between wireless user equipment (UE) in the enterprise network and an external server. The administrator defines a desired quality of service (QoS), including QoS parameters, and assigns them to the microslice. Responsive to the QoS parameters, the system (or the administrator) provides Service Level Objectives (SLOs) for the microslice. At least one bearer is assigned to the microslice, the bearer is selected so that it that meets the QoS and SLOs of the microslice, thus providing an end-to-end logical network between the UE and the external server. Particularly, the logical network connects the UE and external server through at least a Radio Access Network (RAN) and a Core Network. The logical network may also include an enterprise's LAN, which can be used for security and/or to ensure that QoS and SLO requirements are met, and connect with a WAN that also follows the same requirements.

Multiple embodiments are disclosed, which may be useful to a network administrator. In some embodiments, the network administrator can specify one or more applications that are allowed to use the microslice. In some embodiments, the network administrator can define one or more groups of UEs; and assign one or more microslices to each of those groups. In some embodiments, the network administrator can also define a plurality of service types, and assign one or more microslices to those service types. In some embodiments, the network administrator can also specify an amount of network resources to be allocated to the microslice, such as a percentage.

After a request is received by e.g. a UE or another device or component, a microslice instance is set up from the UE and through the at least one bearer assigned to the microslice. A data flow will be created over the microslice instance, and the bearers in the microslice instance will be controlled responsive to the SLOs and said QoS parameters to provide the desired Quality of Service. Embodiments are described in which Key Performance Indexes (KPIs) are provided responsive to the SLOs and QoS parameters, and the microslice instance is monitored using the KPIs, and if the KPIs are not met, then operation of the communication system may be modified accordingly and/or alarms may be provided.

In addition to the above, the following benefits can be provided by some of the embodiments described herein:

- breaking down the core network (EPC) into microservices assigns "dedicated" or "isolated" resources to each microslice;
- the ability to scale each microslice instance intelligently, and independently, honors the Service Level Objectives (SLOs) for that microslice;
- the capability to upgrade each microservice (microslice) independently and remotely over the air, which in some cases can be performed automatically, without input from the network administrators, provides ease of administration and reduces upgrade costs;
- the ability to dynamically move services between the customer's edge and cloud instances provides greater flexibility to serve bursty workloads quickly and efficiently;
- the ability to create logs and get necessary metrics allows real-time monitoring the performance of each microslice instance;
- the ability to operate and administer the network (RAN and Core Network) remotely allows network infrastructure to be provided as a service. Particularly, the microservices architecture provides the opportunity to spin up the resources on the cloud and on demand to technically provide all of the network infrastructure as a cloud native application;
- seamless integration with existing enterprise local area network (LAN) and enterprise backhaul wide area network (WAN);
- providing end-to-end quality of service (QoS) across networks (RAN, LAN and optionally WAN) ensures that users will be served appropriately using adequate resources; and
- providing granular access control enforcement enhances security while ensuring that user have access to what they need.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIG. 1D is a diagram showing one-to-one mapping of standardized QCI values to standardized characteristics.

FIG. 4 is a table showing an example microslice definition.

FIG. 5 is a table showing an example of allowed application definitions for a microslice.

FIG. 7 is a table showing an example of a device group definition.

FIG. 8 is a table showing an example of microslice assignments to device groups.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Communication networks and system components are described herein using terminology and components common to 4G (LTE) communication systems, and/or 5G NR communication systems. However, the principles of the communication network and microslices described herein more widely apply to other communication systems, not only to 4G or 5G systems.

A microslice implementation in the context of an enterprise network is described herein. Although described in the context of an enterprise network, the principles disclosed can also apply to any private network and more generally public networks. An enterprise network is one type of private network. Private networks are operated for use within a limited area by a limited group of authorized users, whereas public networks generally cover a larger area and are open for use by anyone that subscribes to the service by the network operator. An enterprise network is created at an enterprise location such as a warehouse, factory, research center or other building, and is usually operated by an organization for its own use. Other types of private networks may be operated by a private network manager for use by more than one organization.

(2) Microslice Instance and Microslice Overview

Figure 2A:
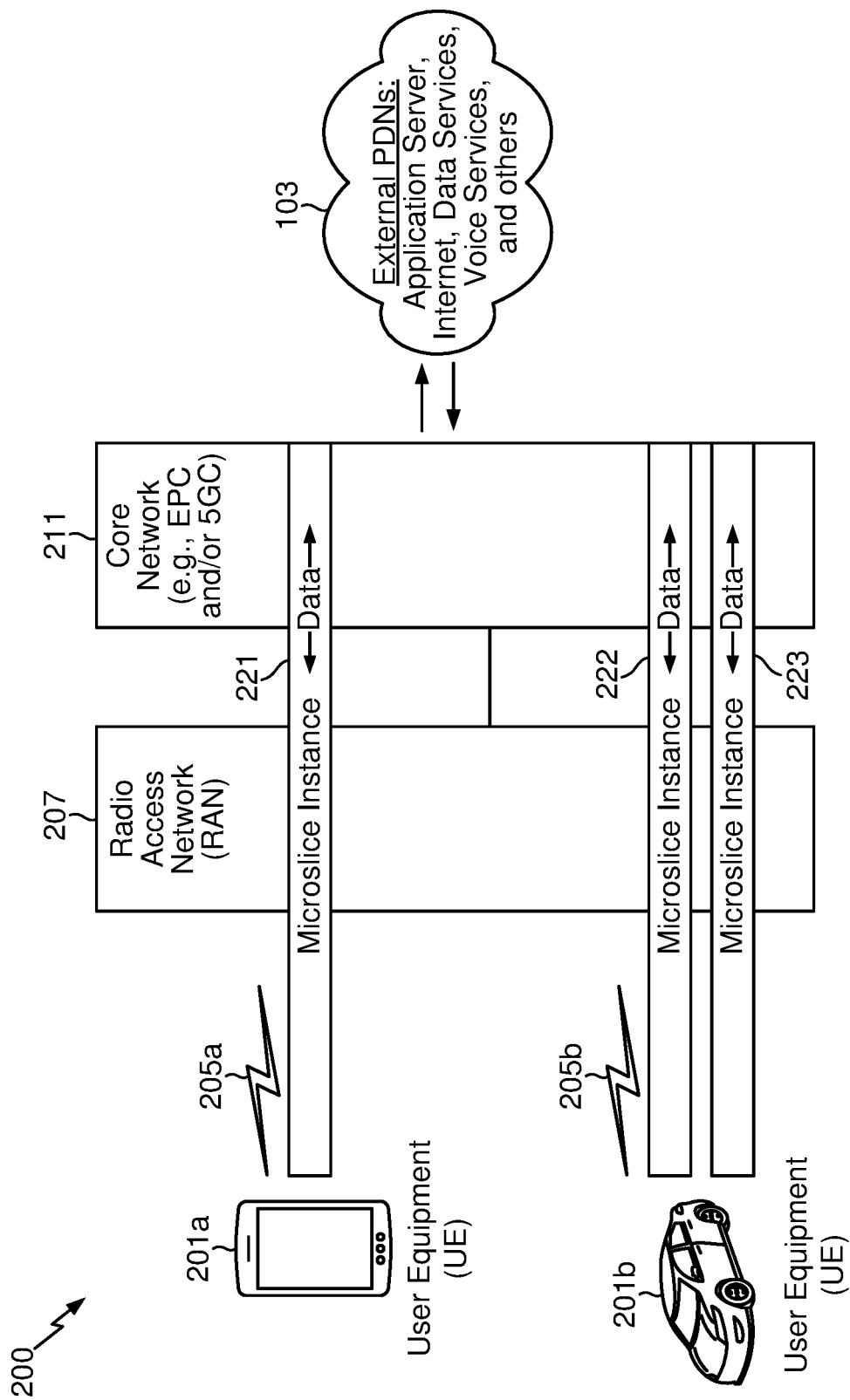
FIG. 2A is a block diagram illustrating microslice instances across multiple networks including a wireless network.

Reference is now made to FIG. 2A, which is a block diagram illustrating microslice instances in a wireless network 200. In FIG. 2A, a mobile phone UE 201a is connected via a wireless link 205a to a RAN 207, which is connected to Core Network 211. A vehicle 201b is connected via a wireless link 205b to the RAN 207. It should be apparent that the different devices, and even different functions in the UEs have different communication requirements. For example, the mobile phone UE 201a may have a need for voice communication. The vehicle 201b may need a highly reliable link for navigation, and another for data communication. To address these needs, microslices are described herein. A microslice defines the path of data flows to, and from, a device. A device may be a UE or other device such as an Access Point (AP), a router, or other component in the communication network. Although typically the microslice's data flow will travel end-to-end (i.e. from the UE to the edge of the external PDN), the data flow may travel through all or parts of the RAN, Core Network, and service platforms. A microslice can be defined in any of a number of ways; for example in some embodiments, a microslice may be defined to meet the requirements of a service type, in other embodiments, a microslice may be associated with an application, or a group of applications. Advantageously, a microslice can be defined by a network administrator operating one or more networks in an enterprise location, and the defined microslices can then be applied to communications within the enterprise location's networks.

In the network 200 each microslice is instantiated (i.e., established within a "microslice instance") in a manner that forms a complete logical network. A logical network is a virtual representation of a network that appears to the user as an entirely separate and self-contained network even though it might physically be only a portion of a larger network or a local area network. In FIG. 2A, a first microslice instance 221 is shown from the mobile phone UE 201a through the RAN 207 and to the Core Network 211. A second microslice instance 222 and a third microslice instance 223 are provided from the vehicle 201b through the RAN 207 and to the Core Network 211. An instance may also be established between other components of the communication network, such as in parts of the RAN and/or the Core Network, or between other components of the communication network. For example, an instance may be established between the UE 201a and the RAN 207, between the vehicle 201b and the RAN 207, or between the RAN 207 and the Core Network 211, or along any communication link (e.g. bearers, as will be described) that may be available.

Each microslice instance 221, 222, 223 is implemented using a set of network functions in the RAN 207 and/or Core Network 211. One example of a Core Network is an Evolved Packet Core (EPC) in an LTE/5G network. The LTE/5G network may be part of an enterprise IT network, or other network.

A microslice defines the parameters and the path of data flows. The data flows may be to and from the UE, through the RAN, Core Network, and service platforms. Note that there can be "N" microslices (MS1, MS2, . . . , MSN) defined in an LTE/5G implementation.

The parameters of the microslices are used to ensure certain Quality of Service (QoS) requirements and Service Level Objectives (SLOs) are met for different service types or applications such as:

IP Camera and Computer Vision (CV) (e.g. facial recognition) applications
Push to Talk (PTT) or Voice over IP (VoIP)
VT (video telephone) or teleconferencing (e.g., zoom, Skype for business)
Augmented Reality (AR)/Virtual Reality (VR)
Remote control
Robotics and automation
Multimedia streaming
Internet of Things (IoT) Sensor data analytics
Best Effort traffic (ftp, web browsing etc.)

For this purpose, microslices can be defined using any of a number of parameters associated with the microslice, for example service type, application, and groups of applications. These parameters may, for example be stored in a Home Subscription Server (HSS) in a 4G system (FIG. 9), or a User Data Management (UDM) in a 5G system (FIG. 10). Each microslice of index "k" (MSk) may be assigned QoS parameters: one QoS Class Indicator (QCI) value, a Guaranteed Bit Rate (GBR) value, a Maximum Bit Rate (MBR) value, and an Allocation and Retention Priority (ARP) value. Advantageously, the microslice architecture enables customizable network capabilities and the ability to select QoS parameters for different service types. For example, each of several service types can be associated with a unique microslice and have a defined data throughput, quality, packet error rate (PER), packet latency, reliability, isolation and set of security services.

(3) Integration and Extension of Microslice QoS into Network Deployments

Figure 2B:
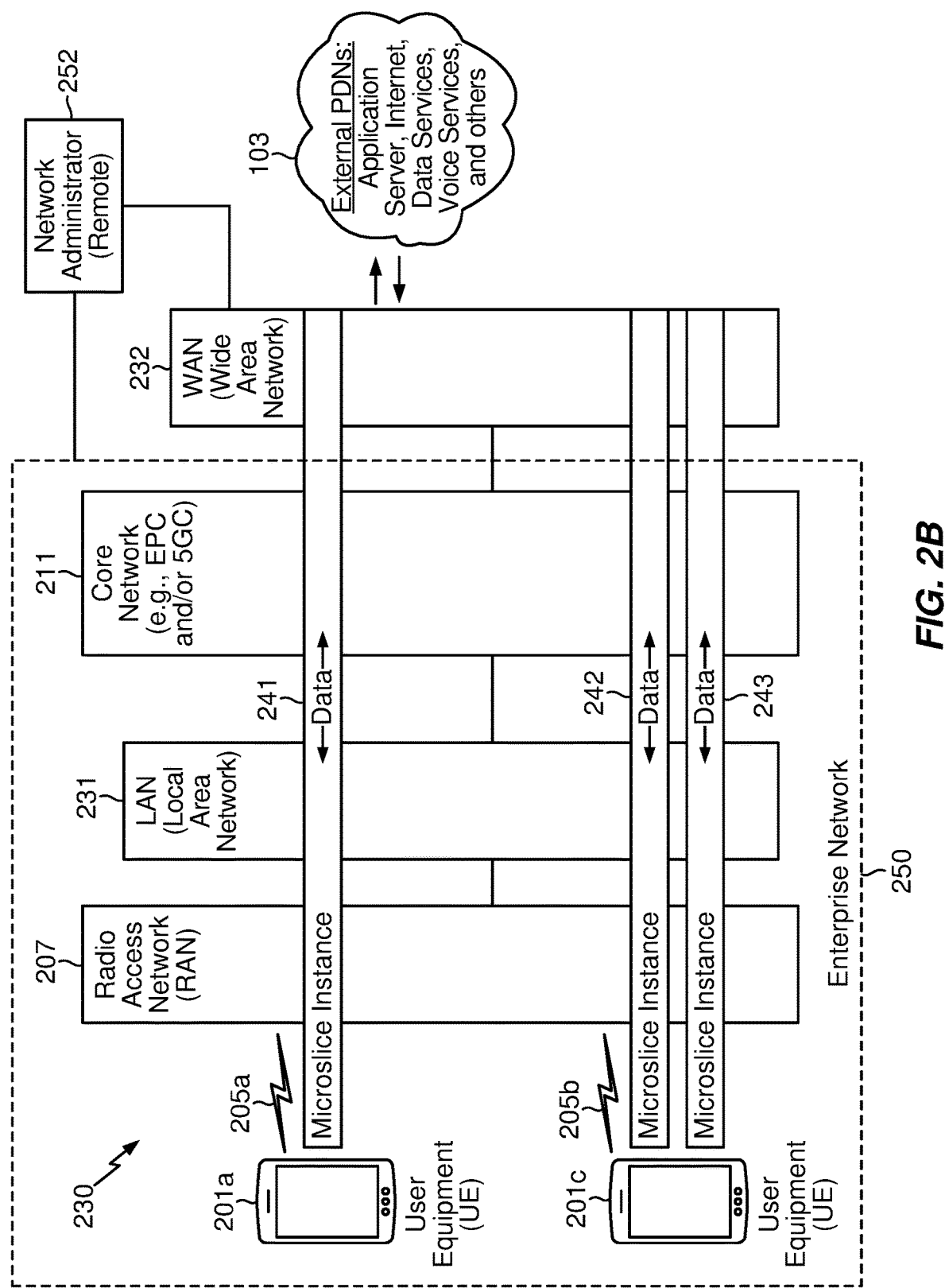
FIG. 2B is a block diagram illustrating microslice instances across multiple networks, including a wireless network, a LAN, and a WAN.

FIG. 2A shows the microslice instances 221, 222, and 223 implemented across the UE 201a, the vehicle 201b, RAN 207, and Core Network 211. As LTE/5G networks are deployed in enterprises, the newly-deployed networks need to be integrated into the local area network (LAN), wide area network (WAN). Reference is now made to FIG. 2B, which is a block diagram illustrating microslice instances across additional networks, including a Local Area Network (LAN) 231 and a Wide Area Network (WAN) 232. In FIG. 2B, the plurality of UEs 201a and 201c are wirelessly connected to the RAN 207. The Local Area Network (LAN) 231 connects the RAN 207 with the Core Network 211. The Wide Area Network (WAN) 232 is connected to the Core Network 211, and connects to a wide variety of external PDNs 103 and other services. These LANs and WANs may be external PDNs outside the Core Network 211. In many cases, firewalls (e.g., next-gen firewalls), may exist to protect the LANs and WANs. These firewalls would also be outside the Core Network 211. In FIG. 2B, the microslice instances extend from the UE, through the networks, and into the WAN 232. Particularly a first microslice instance 241 extends from the UE (mobile phone) 201a, through the RAN 207, LAN 231, Core Network 211, and extend into the WAN 232. The QoS parameters of each the microslices can be extended to these LANs, WANs and firewalls through standard mechanisms such as QoS markings and DiffServ differentiated services code point (DSCP). Similarly, second and third microslices 242 and 243 extend from the auto UE 201b, through the RAN 207, LAN 231, Core Network 211, and extend into the WAN 232.

In FIG. 2B, an enterprise network 250, shown within a block with dashed lines, includes the UEs 201, the RAN 207, LAN 231, and Core Network 211. Typically these will beat a common location, such as a building or other defined area, however some components may be outside the defined area. A network administrator 252 may, with appropriate security, remotely administer the enterprise network 250 via the WAN and set up microslices. Alternatively, the network administrator 252 may connect directly to the enterprise network, to administer the networks and set up microslices.

(4) Microslice Data Fields

Figure 3:
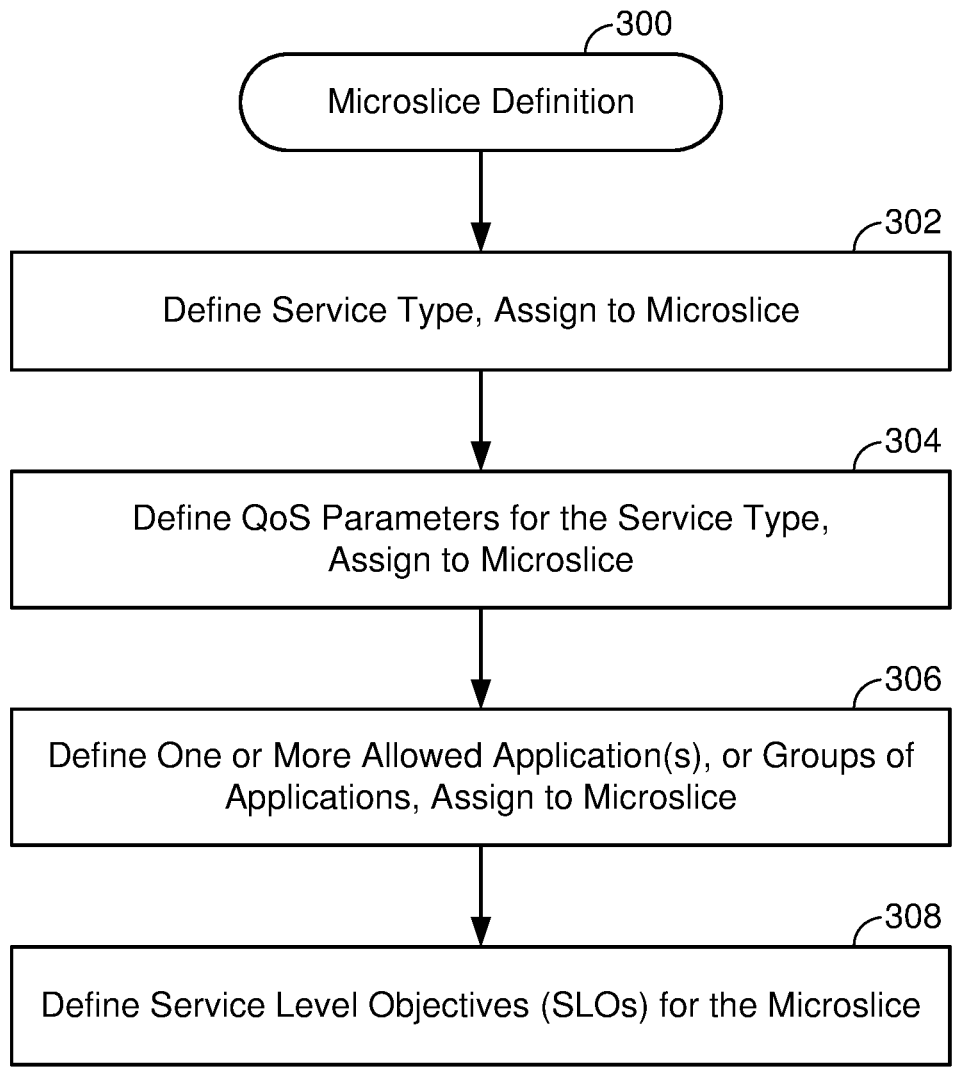
FIG. 3 is a flow chart of a method for defining a microslice.

Reference is now made to FIG. 3, which is a flow chart illustrating one method of defining microslices and the parameters that define the microslice. Operation starts (STEP 300) and then a Service Type is defined (STEP 302). A Service Type may refer to specific activities or applications that are required to provide certain selected services (e.g. videoconferencing, internet download, etc.). The Service Type may be specifically defined a number of ways, for example it may be defined by 5-tuple (server/destination IP address, port number and transport protocol). A specific set of Quality of Service (QoS) requirements such as bit rate, packet latency, and jitter or packet error rate may be assigned to the microslice (STEP 304), based upon the Service Type. The microslice may also be assigned to one or more applications, called "Allowed Applications", or it may be assigned groups of applications (STEP 306). Service Level Objectives (SLOs) are also defined for each microslice (STEP 308). SLOs may be derived from the QoS parameters, and other values. The SLOs are described in more detail elsewhere in this specification, with regard to monitoring the data flow through the microslice instances. Generally, the SLOs for each microslice provide a means for evaluating the performance of the services running over the respective microslice.

Reference is now made to FIG. 4 which shows an example microslice definition. In this example the microslice is defined by parameters that reside within fields. The parameters may, for example, include name, allowed application definitions, minimum guaranteed throughput, maximum allowed throughput, maximum packet delay bound, maximum packet loss rate and priority.

(5) Allowed Application Types

Allowed application types can be identified in a number of ways, for example via:

IP address and/or port number of the server (or destination)

IP address and/or port number of the client (or source)

QoS markings and DiffServ differentiated services code point (DSCP)

Transport protocol used (e.g., TCP or UDP).

FIG. 5 shows an example of definitions that indicate which applications are assigned to a particular microslice. For example, a microslice may be assigned applications that meet the criteria of the first entry, which allows the microslice to be used by any application. Microslices assigned applications that comply with a second entry can only be used by applications defined in accordance with definition of "Application 1" (i.e., having a destination IP address of 1.1.1.1, destination Port 123, etc.).

Further options for identifying applications to be assigned to a microslice include:

DPI (Deep Packet Inspection) for URL/headers,

AI (Artificial Intelligence) or Machine Learning for auto assignment,

LTE/5G device dedicated bearer request,

5G Signaling: NSSAI (Network Slice Selection Assistance Information),

DNS lookups,

Next Gen Firewall query,

SD-WAN, and

APIs for applications to select a microslice.

For the implementation in the enterprise use cases, for each application or a group of similar applications or service types, users can define a microslice and specify QoS constraints as described above.

In an enterprise environment, as a microslice instance is created, traffic can be routed through a pre-existing corporate LAN (e.g. via VLAN or VxLAN) for the purpose of ensuring specific security and access control rules are met, and/or ensuring that specific QoS and Service Level Objective (SLO) specifications are met. The routing, and/or the specific security and access control rules, can be specified by the administrator as part of the definition of a microslice.

(6) Assign Microslice(s) to Devices or Device Groups

Figure 6:
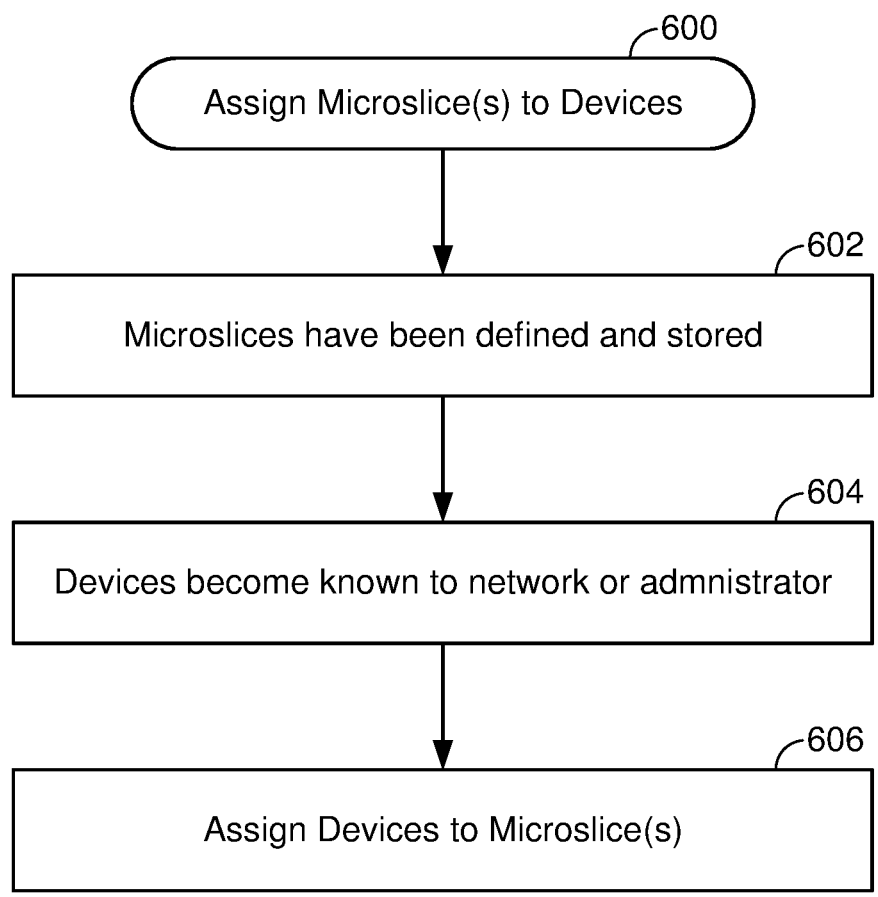
FIG. 6 is a flow chart of a method for assigning a microslice to devices.

Reference is now made to FIG. 6, which is a flow chart of operations (STEP 600) to assign microslices to devices. The term "devices" includes UEs and other devices or components of the communication network such as routers or APs. Microslices are defined and stored in an accessible server (STEP 602), as described above. Many different microslices may be defined in any particular embodiment, some embodiments of which may be part of an LTE/5G implementation.

Next, the devices are assigned to one or more microslices (STEP 606). Generally, when a device or other entity becomes known to the network or administrator, or otherwise requests service, the microslice(s) that best matches the needs of the device should be assigned to provide service to the device. Assignment can be made in a number of ways, for example by matching the device's requested service type with appropriate microslices. In other embodiments, one or more other parameters associated with the microslice can be compared with the requested service type or other parameters associated with the device to determine which microslice(s) would be best suited to carry data to and from the device. Another way of making an assignment is by checking to determine if the device is a member of a device group (see below) and if so, utilizing the group's previously defined microslices.

In one example product implementation, a default microslice called 'Default' is included in the product shipment, and therefore is defined "out of the box" (i.e., predefined in the product). This Default microslice may, for example, be without any QoS guarantees, commonly known as best effort (BE). Thus, when the system is initially installed, for example an entire device group (e.g., all UEs that are cell phones) or in some embodiments all devices (or device groups, discussed below) can be assigned to this default microslice. What this means is that all those devices will be able to, at least, setup a default bearer for all communications, without any QoS guarantees, which is advantageous for initial installation and administration. In one implementation when this default microslice is defined (out of the box), all fields may be set to blank, the application definitions field may be set to 'Permit All', and priority may be set to 15.

(7) Device Groups

To simplify administration and implementation of microslices, some embodiments may include device groups that may be utilized by a network administrator to simplify administration. A device group can be assigned to one or multiple microslices. Examples of devices that might be assigned to one or more different device groups can include devices such as:

Smart Phones,
Tablets,
Handheld Mobile Devices,
Point of Sale (POS) terminals, and
Routers/access points for backhaul.

In one example implementation, a default device group is set up prior to installation (i.e., available "out of the box"), and therefore will be available during installation. This default device group may be called "Default" and unless otherwise specified, each device can be automatically be assigned to the "Default" device group to facilitate initial installation and administration.

A device group is a flexible grouping of devices. Using device groups, enterprises can flexibly create categories for their users/devices that have similar usage, service, coverage and capacity needs in the network. Since this is a flexible grouping, enterprises are at liberty to define these groups to match their current profiling and more efficiently manage devices and network resources.

A device group can be defined with specific information such as device group name, administrator name, a trusted/untrusted field, VLAN or VxLAN ID and DHCP server address. FIG. 7 shows an example device group definition, including Field Name, a Value Example for that field, and a Field Description for that field. In FIG. 7 the Field Namesspecific to this example include: Device group name, Admin, Trusted, VLAN or VxLAN ID, and DHCP.

Mobile devices (UEs) in an enterprise can be assigned to a device group, which may include many mobile UEs, but in some embodiments, a particular UE can be assigned to only one group.

The device may be assigned to a group by an administrator, for example, or may be assigned in response to information provided by the device, or may be assigned by default. In one implementation, the assignment can be implemented as a containerized application running in the Core Network, on Kubernetes or any other such system. Kubernetes is an open source container-orchestration system for automating application deployment, scaling and management. Containers have become popular as enterprises use DevOps for faster development and deployment of applications. Containers include everything needed to run software, including files and libraries. Containers combine the libraries of an application or microservice into one deployable unit that does not deplete the CPU or memory resources of the host operating system and provide isolation for different services running on the same CPU.

In one preferred implementation, the EPC function can be implemented as a containerized application running on Kubernetes. This allows following benefits for the microslicing implementation described herein, such as:

1. Breaking down the core network (EPC) into microservices provides "dedicated" or "isolated" resources for each microslice.
2. Scaling each microservice intelligently and independently honors the SLO for microslices.
3. Upgrading each service independently and over the air with zero touch from the network administrators reduces costs and simplifies the upgrading process.
4. Dynamically moving services between the customer's edge and cloud instances helps to serve bursty workloads.
5. The ability to log and get necessary metrics for monitoring the performance of each microslice, ensures each UE is getting an appropriate level of service, and improves network efficiency.
6. Also, this allows the network (RAN and EPC) to be run as a network infrastructure service. The microservices architecture provides the ability to spin up the resources on the cloud and on demand so technically all of the network infrastructure can be provided as a cloud native application.

FIG. 8 is a table showing an example of how microslices can be assigned to different device groups. For example, FIG. 8 shows that Device Group 1 is assigned to the microslice called "Streaming", to the microslice called "Video Conf" and to the "Default" microslice. In addition to a device group being assigned to more than one microslice, it is likely that more than one device group will be assigned to one or more of the same microslices depending on the needs of the enterprise. If multiple microslices are enabled for a device group, some or all of the applications running on a device within the device group may be assigned to a particular one of the enabled microslices. Alternatively, a default microslice can be used for any application or services that are not assigned to other microslices. Alternatively, a decision mechanism may be provided to select between multiple microslices to which the device running the application is assigned.

(8) 4G and 5G Architectures

The microslices described herein will typically be implemented in LTE and/or 5G wireless communication networks; that is, communication networks that are constructed according to the specifications of Standard Development Organizations (SDOs) such as 3GPP. The basic components of these communication networks are well-known, and need not be discussed in detail. However, for purposes of description, these communication networks are discussed briefly herein. Much additional information is available in the current SDO specifications, such as 3GPP specifications TS 21.905, TS 22.852, TS 23.002, TS 23.203, TS 23.501, TS 36.300.

Figure 9:
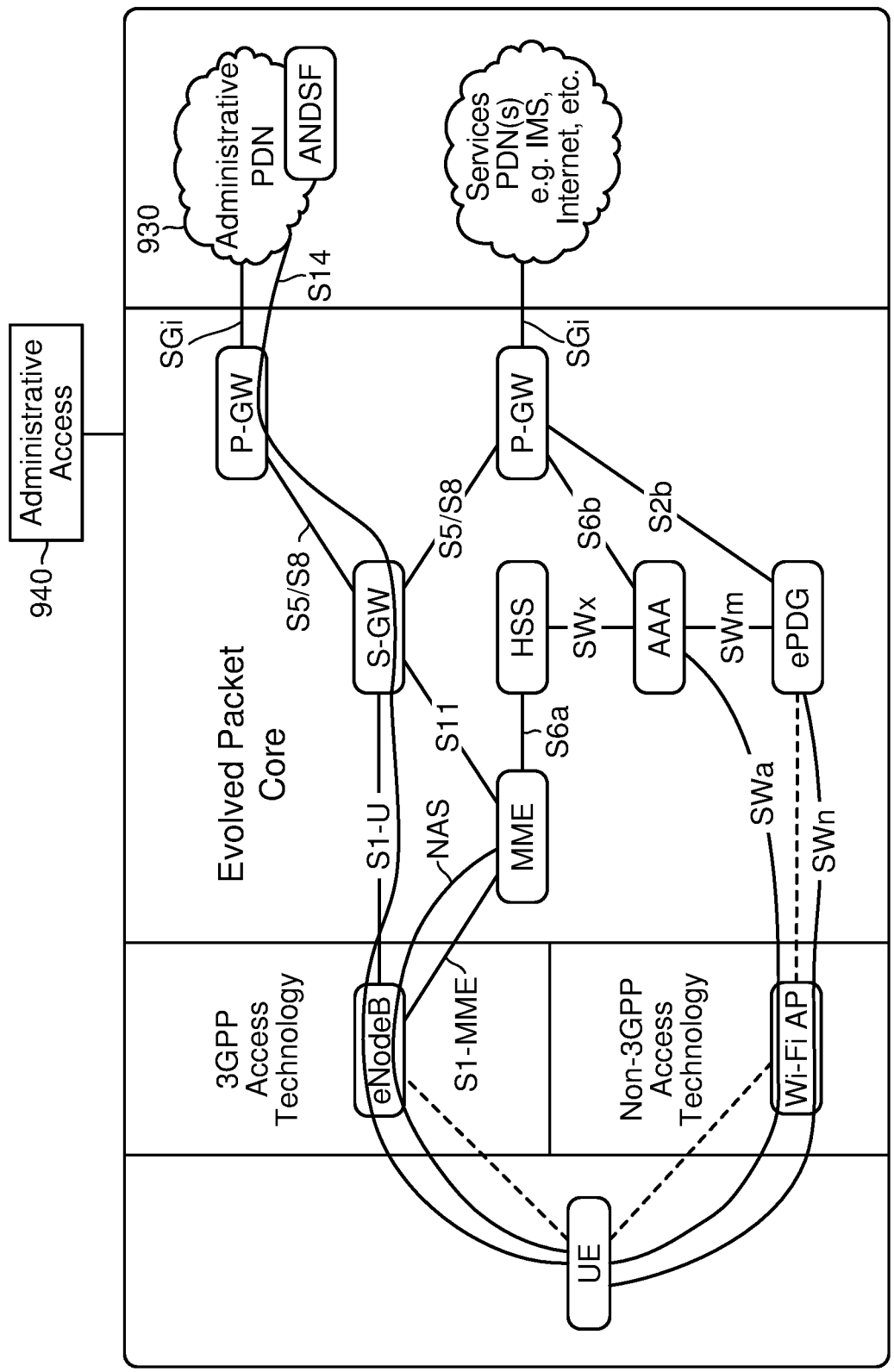
FIG. 9 is a block diagram of a 4G wireless communication network.
Figure 10:
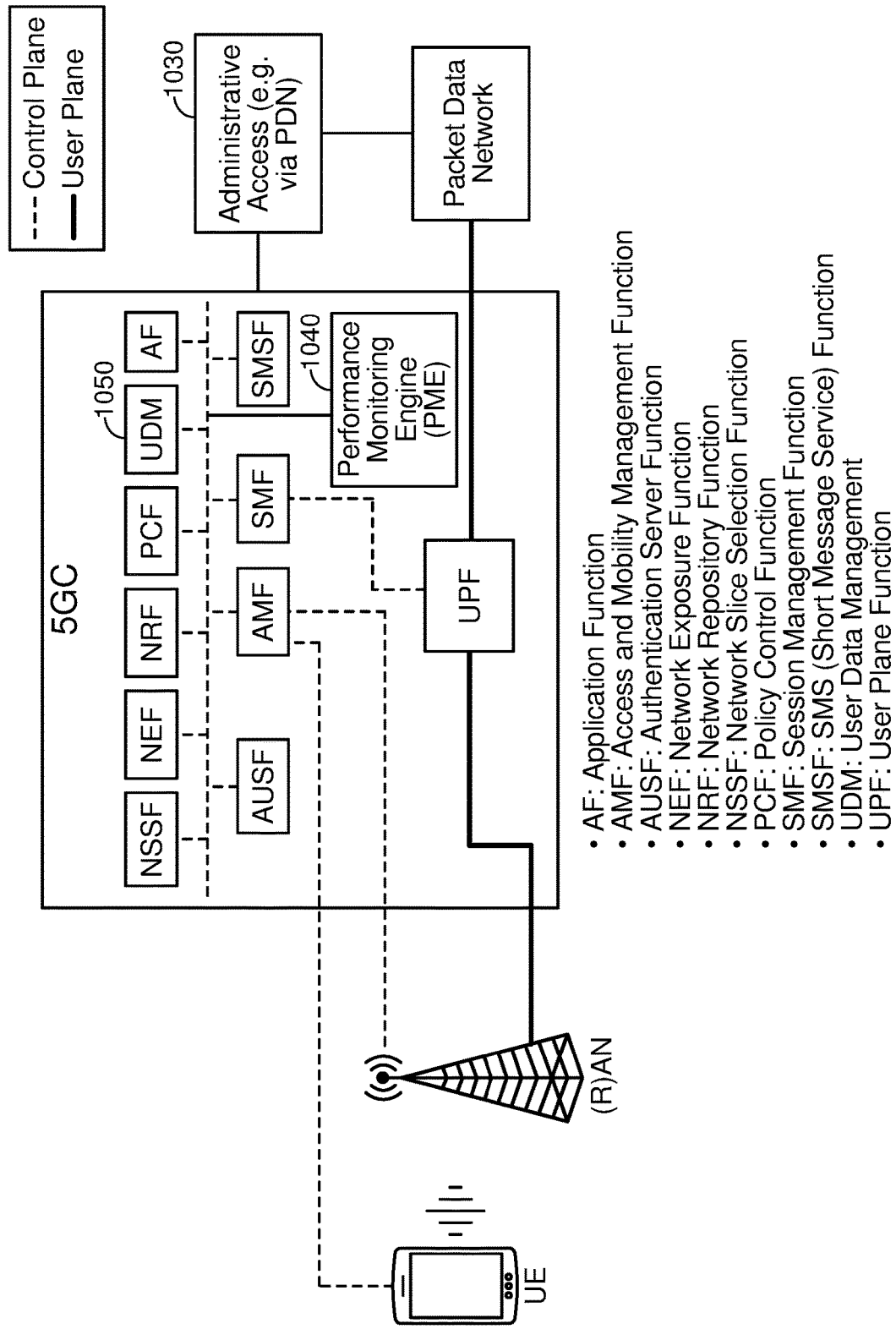
FIG. 10 is a block diagram of a 5G wireless communication network.

Reference is now made to FIG. 9, which is a network diagram showing an architecture of an LTE (4G) wireless communication system. The 4G network in FIG. 9 has a flat, all-IP architecture with separation of control plane and user plane traffic. Acronyms are shown in the network blocks. The following is a list of acronyms shown in the network blocks and other acronyms used in 4G systems:

| | |
|---|---|
| ANDSF: | Access Network Discovery and Selection Function |
| APN: | Access Point Name |
| ARP: | Allocation and Retention Priority |
| AMBR: | Aggregate Maximum Bit Rate |
| ePDG: | Evolved Packet Data Gateway |
| E-RAB | EPS Radio Access Bearer |
| EPC: | Evolved Packet Core |
| EPS: | Evolved Packet switched System) |
| GBR: | Guaranteed Bit Rate |
| HSS: | Home Subscription Server |
| MBR: | Maximum Bit Rate |
| MME: | Mobility Management Entity |
| PCC: | Policy Control and Charging |
| PCRF: | Policy and Charging Rules Function |
| PDB: | Packet Delay Budget |
| PDN: | Packet Data Network |
| PELR: | Packet Error Loss Rate |
| P-GW: | Packet Gateway |
| QCI: | QoS Class Identifier |
| QoS: | Quality of Service |
| RAB: | Radio Access Bearer |
| RRC: | Radio Resource Control |
| SAE: | System Architecture Evolution |

-continued

| | |
|---|---|
| SDF: | Service Data Flow |
| S-GW: | Serving Gateway |
| TFT: | Traffic Flow Template |
| VoIP: | Voice over IP |
| Wi-Fi AP: | WiFi Access Point |

A main component of the 4G architecture shown in FIG. 9 is the Evolved Packet Core (EPC), which is the Core Network. Some components are described below.

MME (Mobility Management Entity: The MME is the key control-node for the LTE access-network. It is responsible for idle mode UE (User Equipment) paging and tagging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the HSS for roaming UEs.

SGW (Serving Gateway) The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PGW). For idle state UEs, the SGW terminates the downlink data path and triggers paging when downlink data arrives for the UE. It manages and stores UE contexts, e.g. parameters of the IP bearer service, network internal routing information. It also performs replication of the user traffic in case of lawful interception.

PGW (Packet Data Network Gateway): The PDN Gateway provides connectivity from the UE to external packet data networks by being the point of exit and entry of traffic for the UE. A UE may have simultaneous connectivity with more than one PGW for accessing multiple PDNs. The PGW performs policy enforcement, packet filtering for each user, charging support, lawful interception, and packet screening. Another key role of the PGW is to act as the anchor for mobility between 3GPP and non-3GPP technologies such as WiMAX and 3GPP2 (CDMA 1× and EVDO).

HSS (Home Subscriber Server): The HSS is a central database that contains user-related and subscription-related information. The functions of the HSS include functionalities such as mobility management, call and session establishment support, user authentication and access authorization. The HSS is based on the pre-Release-4 Home Location Register (HLR) and Authentication Center (AuC).

ANDSF (Access Network Discovery and Selection Function): The ANDSF provides information to the UE about connectivity to 3GPP and non-3GPP access networks (such as WiFi). The purpose of the ANDSF is to assist the UE to discover the access networks in their vicinity and to provide rules (policies) to prioritize and manage connections to these networks.

ePDG (Evolved Packet Data Gateway): The main function of the ePDG is to secure the data transmission with a UE connected to the EPC over untrusted non-3GPP access, e.g. VoWi-Fi. For this purpose, the ePDG acts as a termination node of IPsec tunnels established with the UE.

An Administrative PDN is provided and shown at 930 in FIG. 9, connected to the EPC, that allows administrative access to the components. Alternatively, there may be administrative access 940 via a direct (non-PDN) connection to the EPC. In one microslice implementation, administrative operations to define and setup the microslice in the EPC, and monitor and operate the microslice instance in the communication network, can be performed via the Administrative PDN 930 or Administrative Access 940.

Reference is now made to FIG. 10, which is a network diagram of an LTE (4G) wireless communication system. In this 5G architecture, a Core Network is referenced as 5GC (5G Core). In FIG. 10, acronyms are shown in the network blocks. Following is a list of acronyms shown in the network blocks and other acronyms used in 5G systems:

| | |
|---|---|
| AF: | Application Function |
| AMF: | Access and Mobility Management Function |
| AUSF: | Authentication Server Function |
| NEF: | Network Exposure Function |
| NRF: | Network Repository Function |
| NSSF: | Network Slice Selection Function |
| PCF: | Policy Control Function |
| PCEF: | Policy and Charging Enforcement Function |
| SD: | Slice Differentiator |
| SMF: | Session Management Function |
| SMSF: | SMS (Short Message Service) Function |
| SST: | Slice/Service Type |
| UDM: | User Data Management |
| UPF: | User Plane Function |

Administrative access 1030 is provided to the 5GC, such as via a PDN connected securely to the 5GC, which allows administrative access to the components such as the UDM in the 5GC. In one microslice implementation, administrative operations in the EPC to define and setup the microslice, and to monitor and operate the microslice instance throughout the communication network can be performed via this Administrative access. In one example, the User Data Management (UDM) function 1050 may be utilized to set up and store the data fields relating the microslices, service types, device groups, applications and other useful information.

(9) Microslice Set Up: Assign Bearer(s)

In LTE and 5G communication systems, a bearer is an information transmission path that has defined capacity, delay and bit error rate, and possibly other characteristics. Depending upon the configuration of the communication system as implemented, a number of bearers will be defined across different blocks of the system. Referring briefly to the 4G architecture shown in FIG. 9, bearers are represented by the lines connecting components. Bearers in the 4G LTE network architecture are described in detail in a later section, for example, bearers are shown in FIGS. 17 and 18, and described with reference thereto. As will be apparent to one skilled in the art, the bearers available in any particular network architecture may differ between embodiments. If the particular network architecture is defined by standards, then the bearers will be implemented according to those standards.

Figure 11:
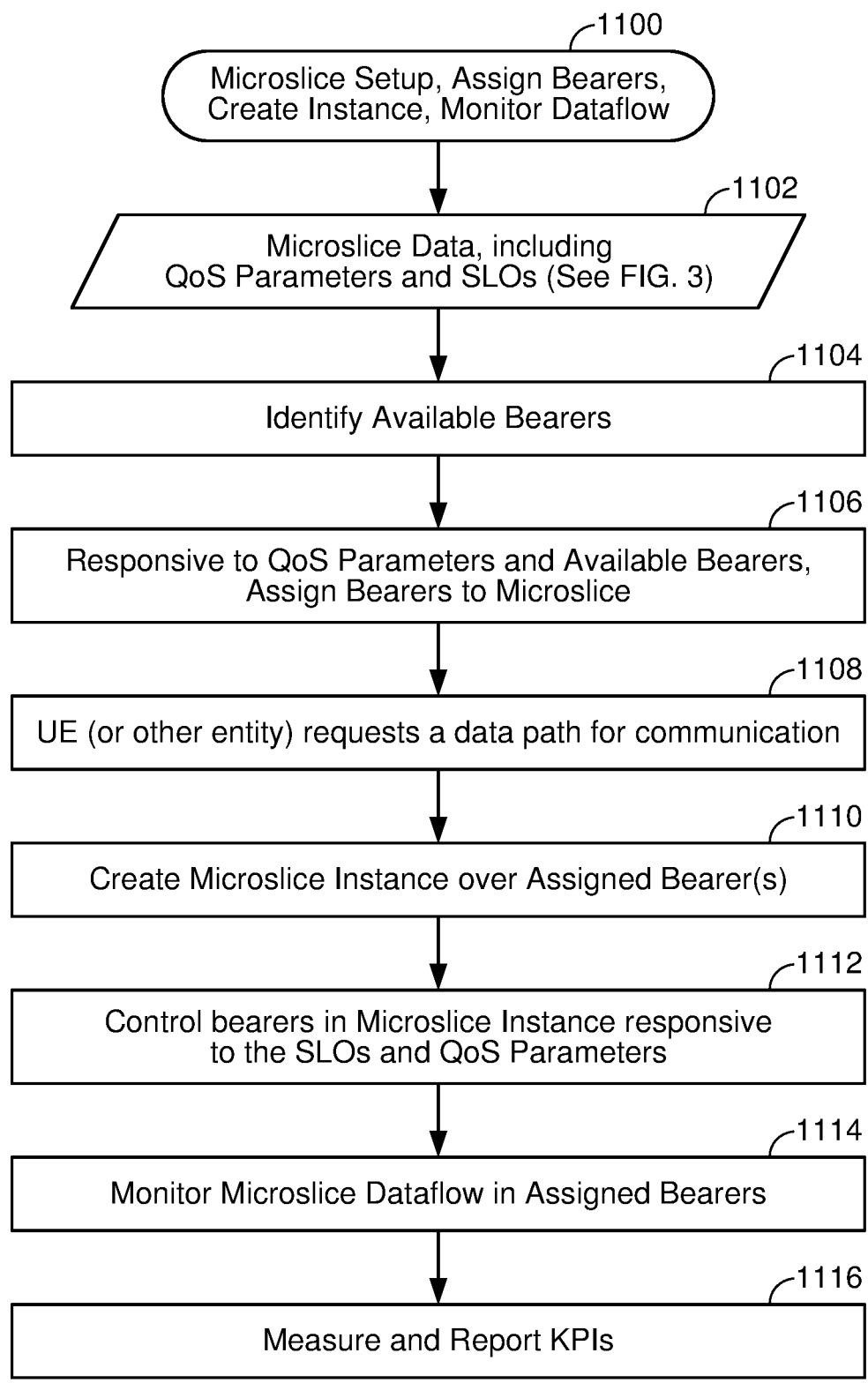
FIG. 11 is a flow chart of a method for setting up a microslice data flow, and creating a microslice instance to provide the data flow.

Reference is now made to FIG. 11, which is a flow chart of operations to set up the microslice. After operation begins (STEP 1100), microslice data, including the QoS parameters and the SLOs, is provided (STEP 1102). Available bearers are then identified (STEP 1104) for example by communication with the Core Network. Responsive to the QoS parameters and/or the SLOs, bearers are assigned to the to the microslices. Particularly, microslices are set up with one or more of the bearers that are available within the configuration of the communication system. In summary, to meet SLO and QoS requirements of a microslice, at least one bearer, whether a dedicated bearer or a default bearer, is assigned to a microslice.

The following information, defined by the microslice data fields, can be used in one example to select a bearer:

1. Destination IP addresses & port numbers allowed,
2. Minimum throughput requirement (IP layer),
3. Maximum throughput requirement (IP layer),
4. Maximum Packet delay budget (IP layer - between P-GW and UE),
5. Maximum Packet loss rate (IP layer - between P-GW and UE),
6. Priority (1-15), and
7. Standardized characteristics (mapping done internally):
   QCI (QoS Class Identifier) (1-9),
   GBR (Guaranteed Bit Rate) (0-10 Gbps),
   MBR (Maximum Bit Rate) (0-10 Gbps), and
   ARP (Allocation and Retention Priority) Pre-emption capability/vulnerability, Priority
(1-15)

Figure 1A:
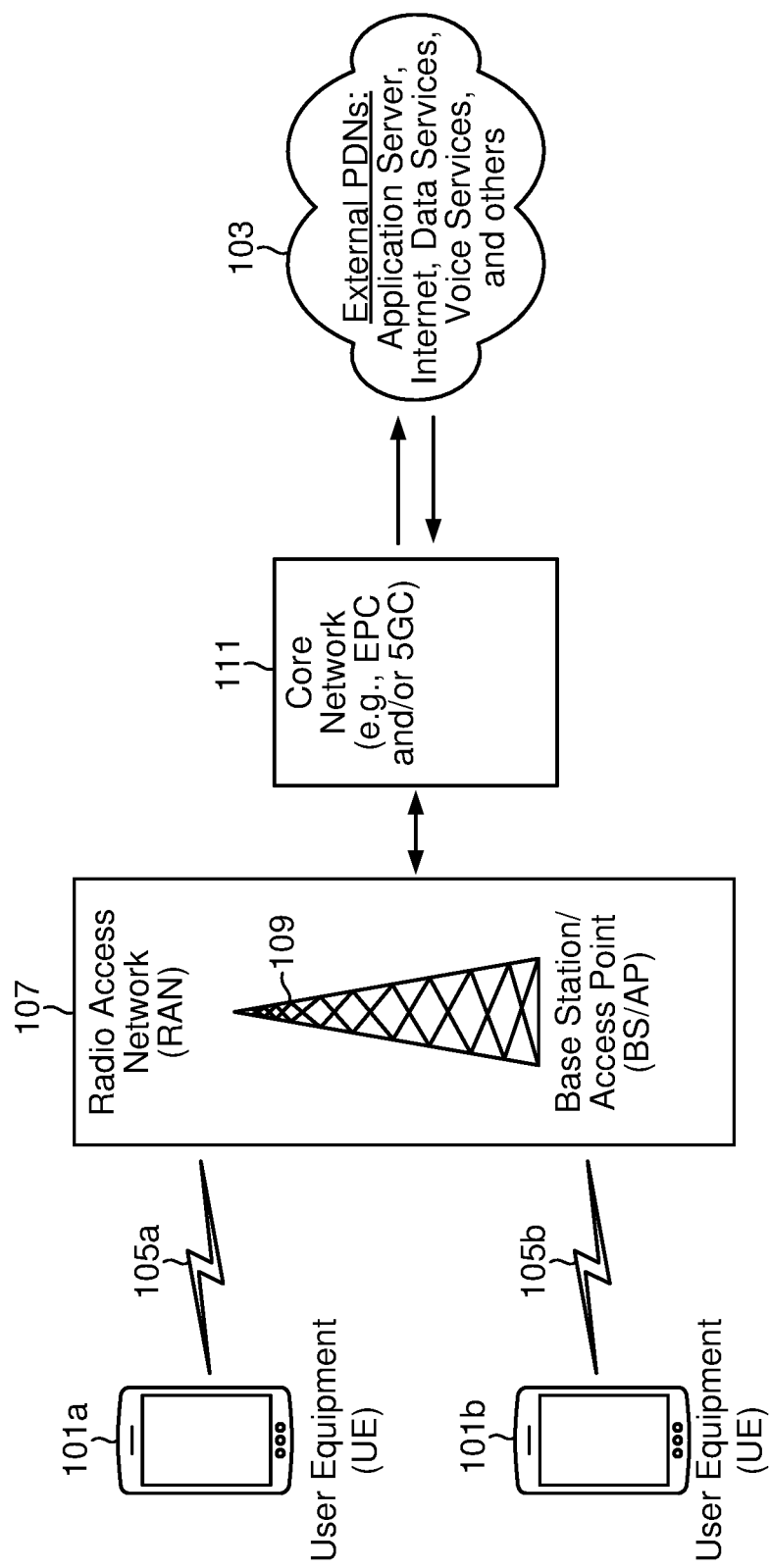
FIG. 1A is an illustration of a basic configuration for a communication network, such as a "4G LTE" (fourth generation Long-Term Evolution) or "5G NR" (fifth generation New Radio) network.
Figure 1B:
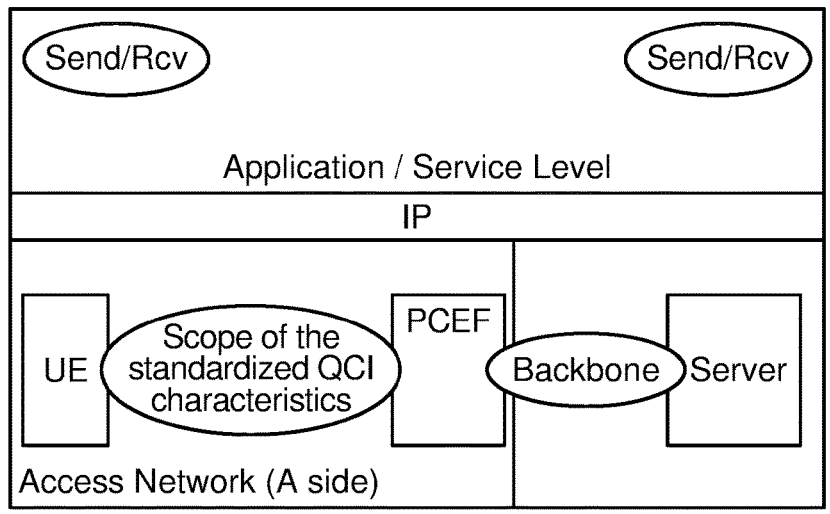
FIG. 1B is a diagram showing the scope of the Standardized QCI characteristics for a client/server architecture.
Figure 1C:
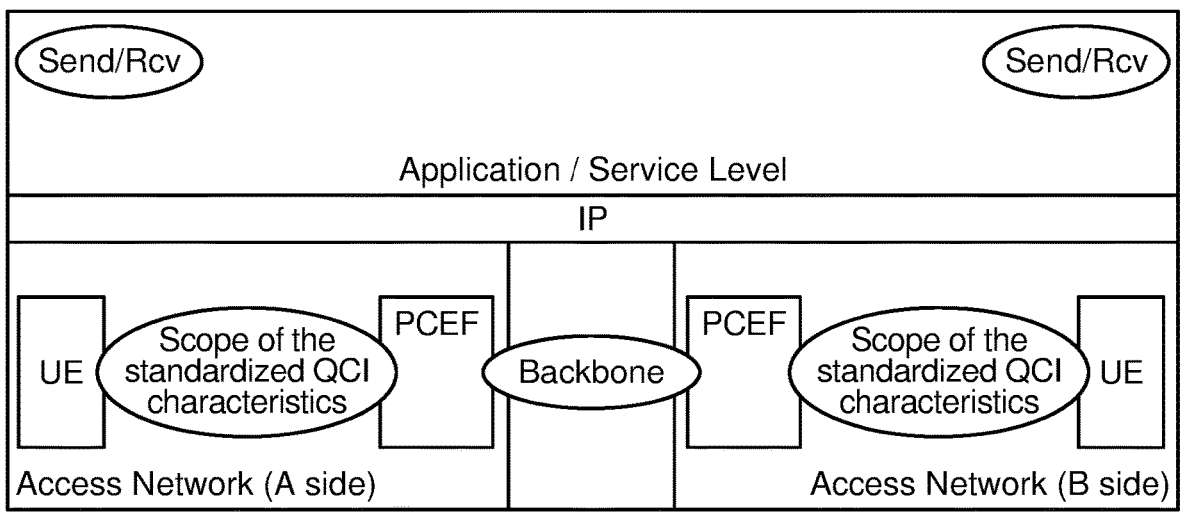
FIG. 1C is a diagram showing the scope of the Standardized QCI characteristics for peer/peer communication.
Figure 1E:
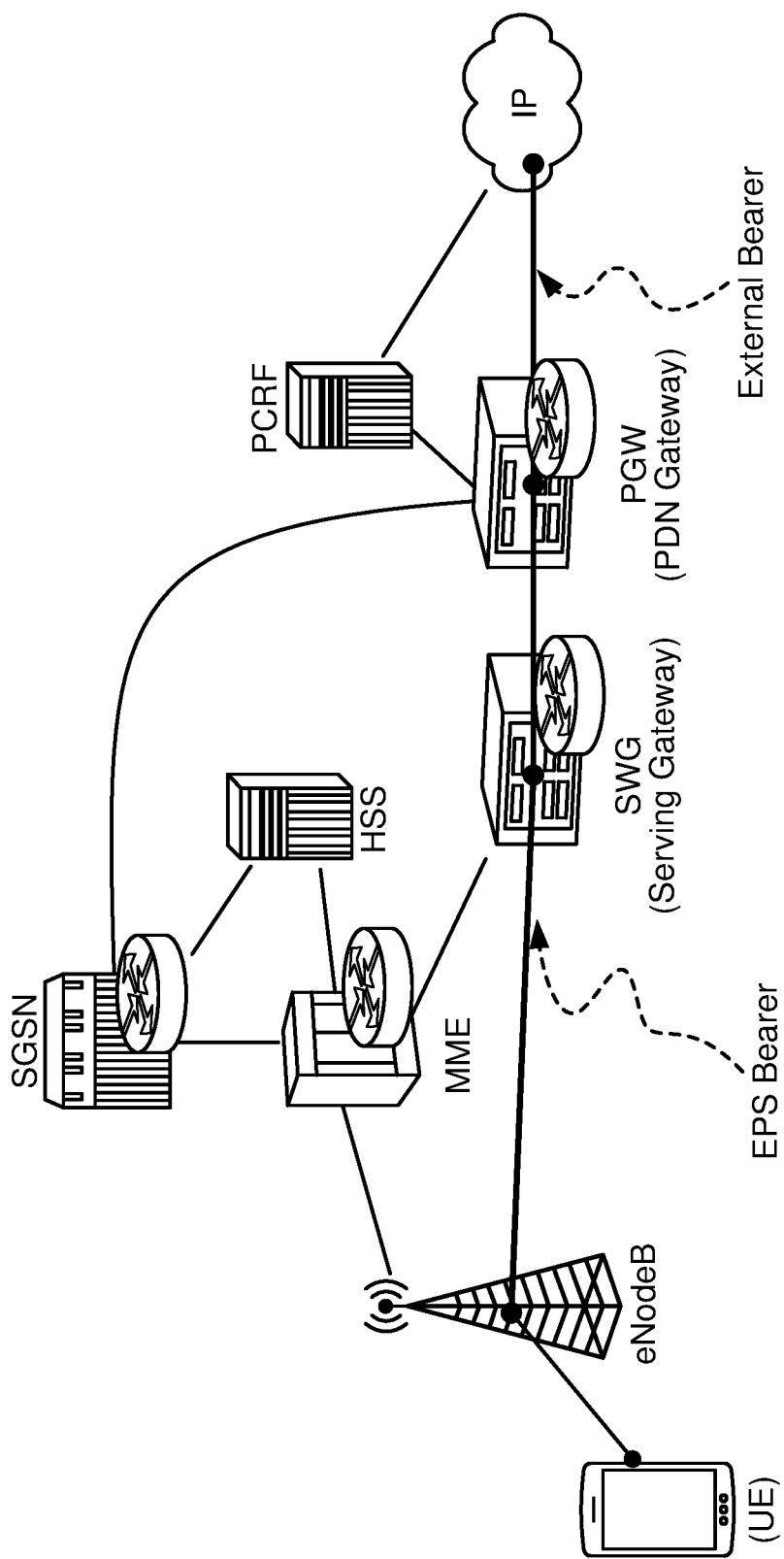
FIG. 1E is a system diagram of an EPS Bearer and an External Bearer in a 4G wireless communication system.
Figure 1F:
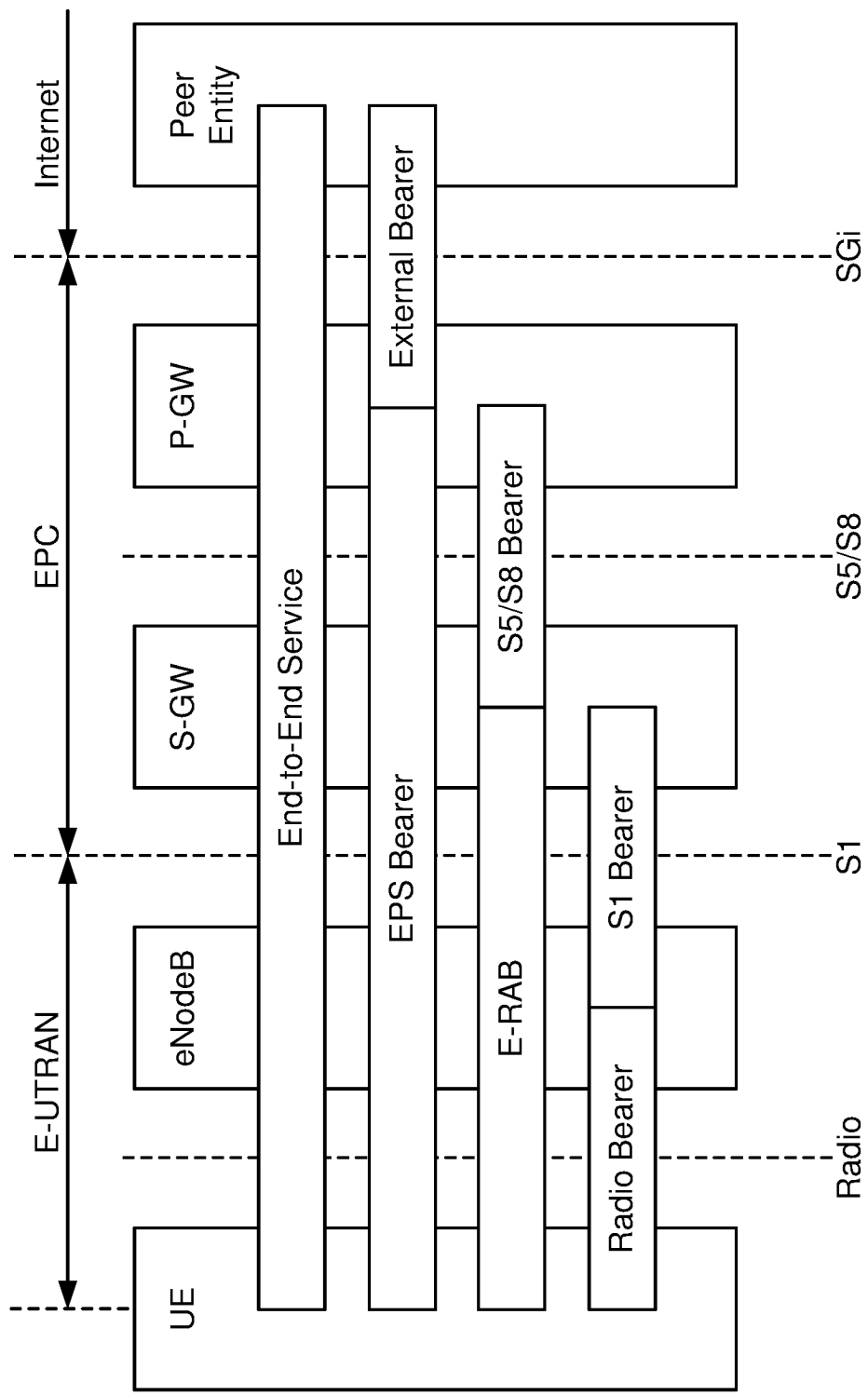
FIG. 1F is a system diagram illustrating different types of bearers in a 4G wireless communication system.
Figure 1G:
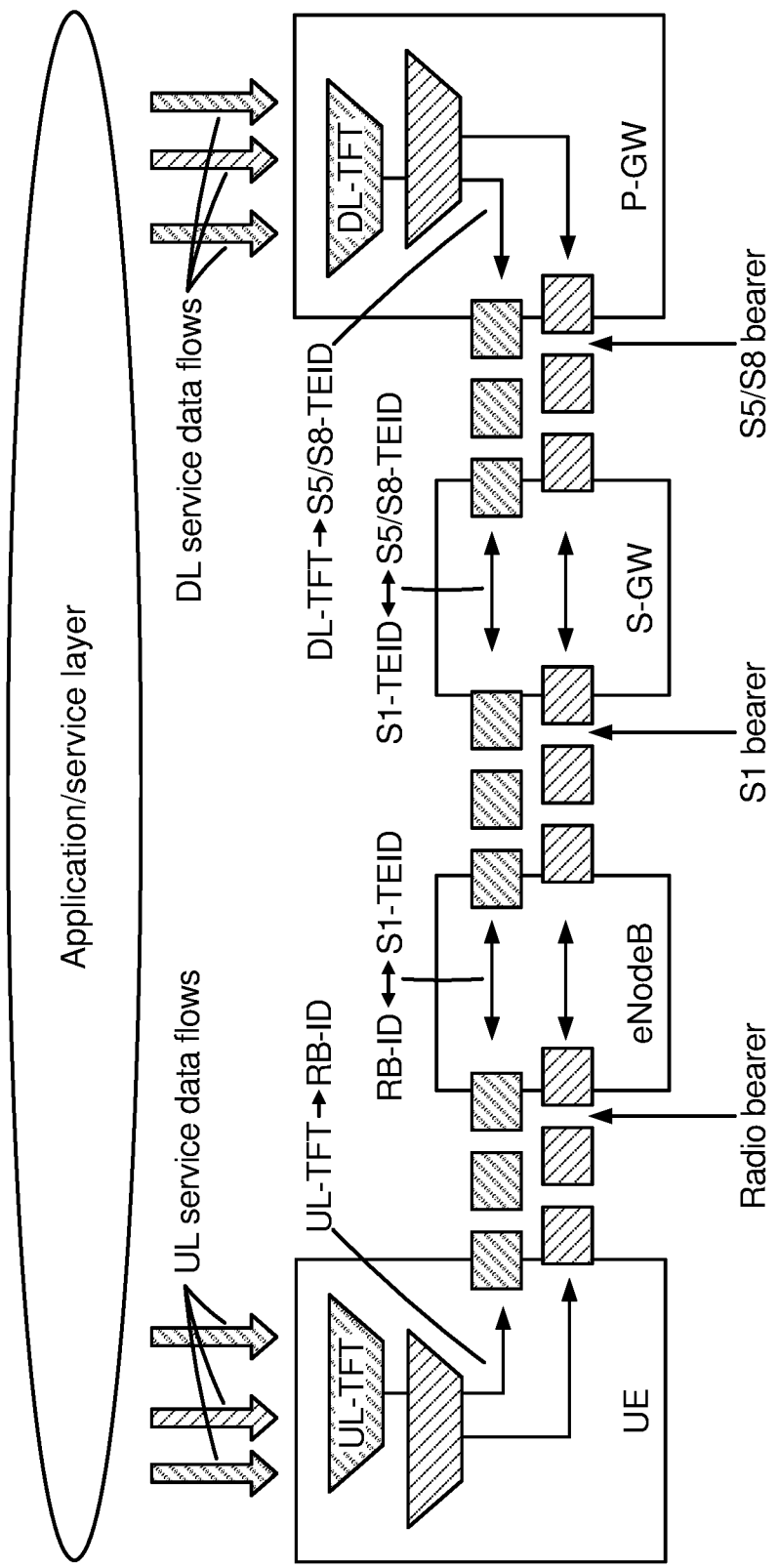
FIG. 1G is a system diagram of an application/service layer in a 4G wireless communication system.
Figure 1H:
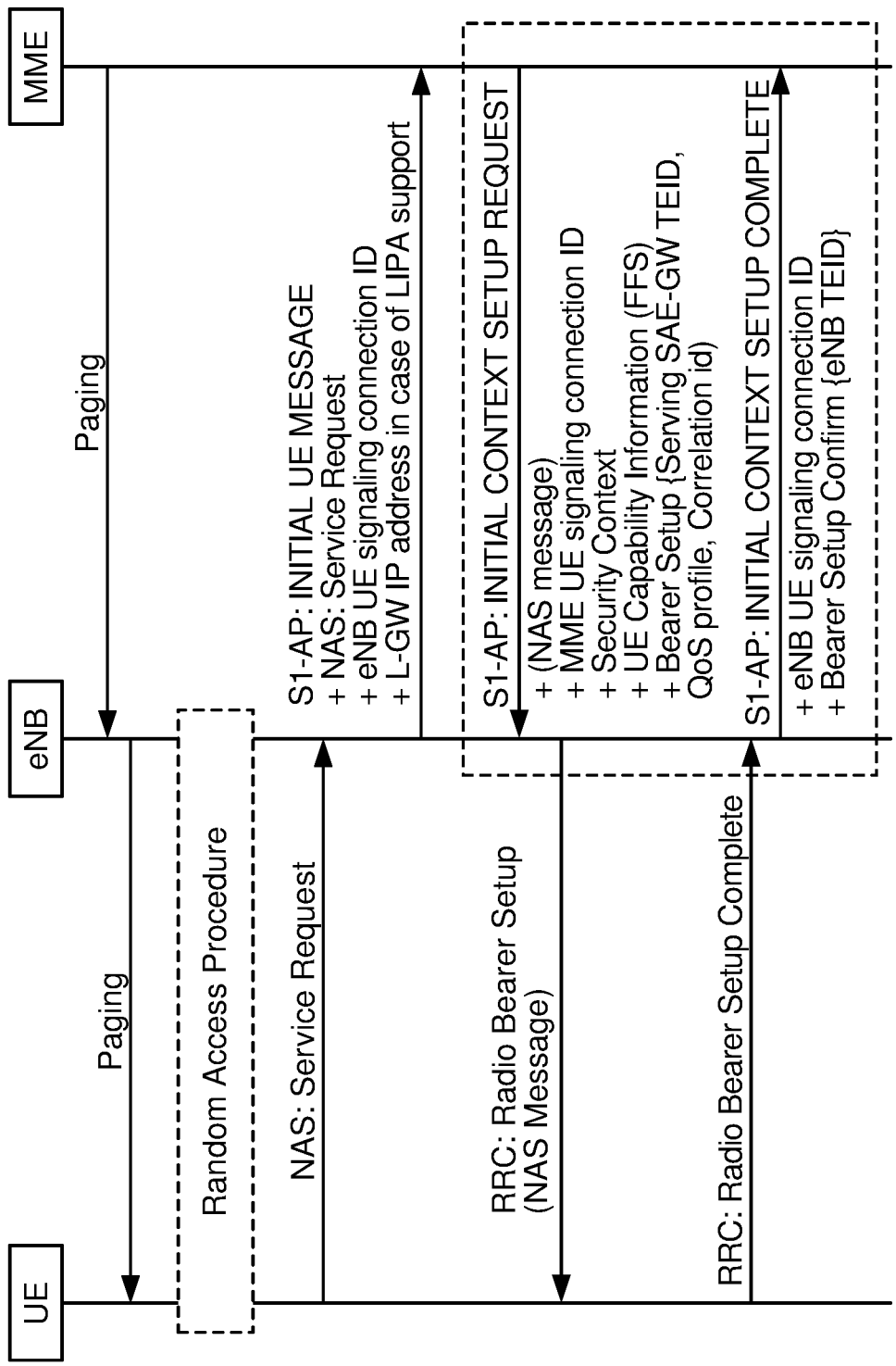
FIG. 1H is a message flow diagram for setting up a bearer in a 4G wireless communication system, showing messages between the UE, an eNB, and the MME.
Figure 1I:
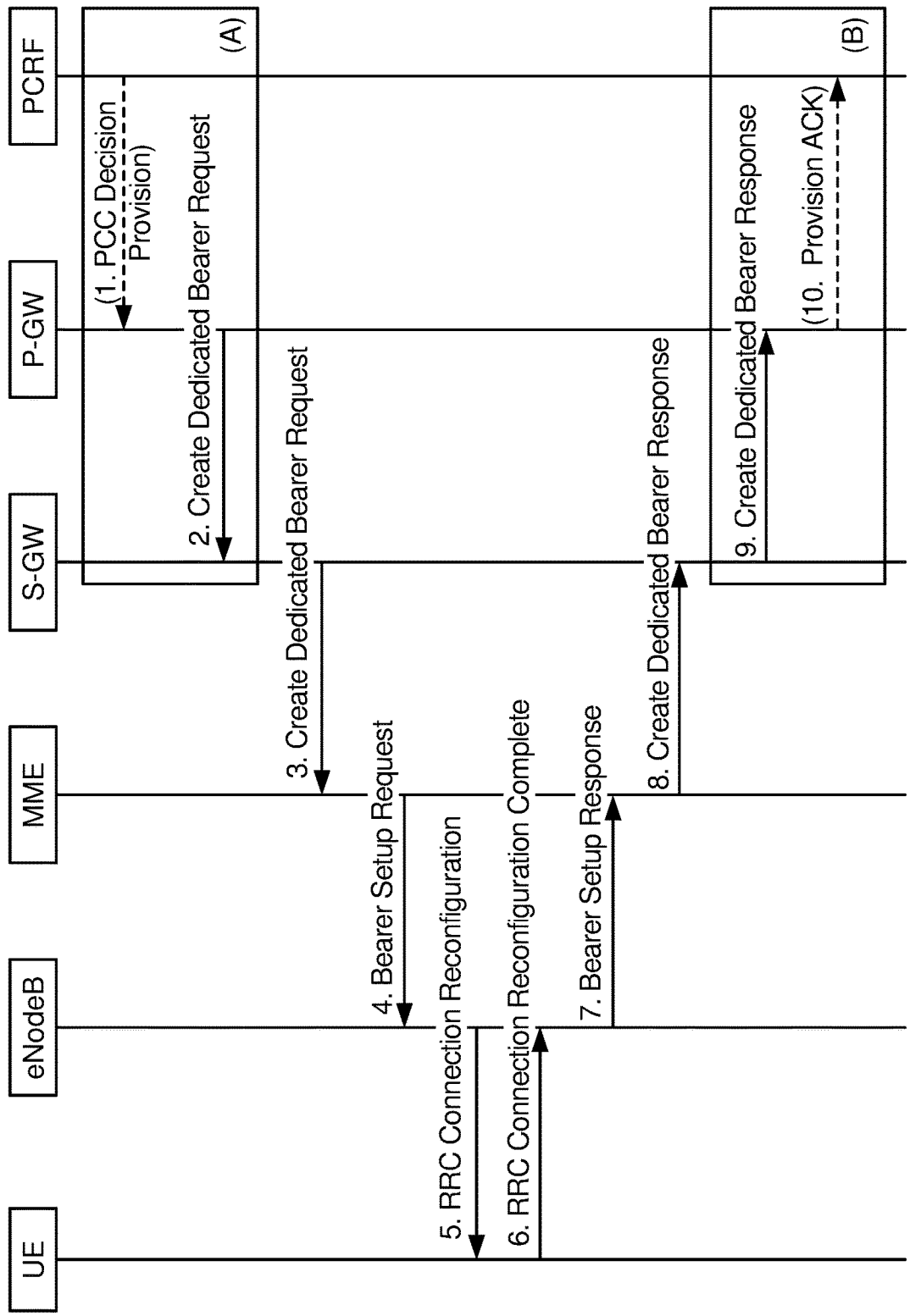
FIG. 1I is a detailed message flow diagram for establishing a bearer in a 4G wireless communication system, showing messages between the UE, eNodeB, MME, S-GW, P-GW, and PCRF.

Items 1-6 above are defined by the end-user (e.g. network administrator), based on Service Level Objectives (SLOs) associated with each micro slice. Item 7 (standardized characteristics) is a mapping done by the system to define standardized characteristics (QCI characteristics in this example) associated with the microslice. The mapping to define these characteristics may vary between embodiments, depending upon the particular standard implemented. In the example of LTE 4G, Release 10, standardized QCI characteristics are defined as shown in FIG. 1D, and discussed with reference thereto. Note that there can be "M" microslices (MS1, MS2, . . . , MSN) defined in an LTE/5G implementation. Each microslice "k" (MSk) is assigned QCI characteristics: one QCI value, a GBR value, an MBR value, and an ARP value.

As different EPS bearers (e.g., Radio Bearer, S1 bearer, S5/S8 bearer) are setup for different UEs in the system, each bearer will be assigned to a particular microslice. Both the RAN and the EPC treat the bearer in accordance with the requirements of that microslice.

Also, as the bearers are selected, they may be chosen so that a predetermined amount (e.g. a percentage) of resources is allocated for each microslice, in either or both of the RAN and EPC, or in the other networks (e.g. the LAN) through which the microslice is defined. For example the RAN can reserve a certain amount of airlink resources in terms of physical resource blocks (PRBs) as minimum guaranteed set of resources as long there is sufficient amount of data in the buffers. Similarly, a certain amount of CPU and memory resources can be allocated on the EPC for each microslice. Also, if there are multiple CPUs, one of the CPUs may be allocated to a particular microslice.

(10) Create Microslice Instance

Referring again to FIG. 11, after the bearers have been assigned (STEP 1106), the microslice is ready to be utilized for communication purposes. The UE (or some other entity) requests a data path for communication (STEP 1108). In response to the request, a microslice instance is set up between the two entities, over the Assigned Bearers (STEP 1110). After communication begins, the bearers in the microslice instance are controlled (STEP 1112) responsive to the QoS parameters and the SLOs of the microslice, to attempt to meet those performance requirements. In order to provide information with which to control the bearers, the microslice data flow is monitored (STEP 1114).

(11) Key Performance Indicators (KPIs)

As previously discussed, Service Level Objectives (SLOs) are defined for each microslice. The SLOs for each microslice provide a means of measuring the performance of the services running over the respective microslice. In order to measure the performance of the network, and to help to assess whether or not the SLOs for each microslice are being met, Key Performance Indicators (KPIs) may be measured and reported (STEP 1116) for each bearer or combination of bearers in each micro slice. The measured KPIs can then be compared with the desired SLOs to determine the extent to which performance goals are being met. The KPIs may include the following in one example:

Packet Throughput (IP layer),
Packet latency (IP layer—between EPC and UE),
Packet loss rate (IP layer—between EPC and UE), and
Packet jitter rate (IP layer—between EPC and UE).

The KPIs can be monitored by the RAN, Core Network and/or devices, in combination or individually. In one implementation, a preferred method is to utilize only the Core Network to measure these KPIs directly using a Performance Monitoring Engine (PME), shown at 1040 in FIG. 10.

In a 4G embodiment, for each bearer, the EPC is a Core Network that may monitor and reports the actual achieved throughput in bits per second both on the downlink and uplink directions.

In some embodiments, the EPC generates diagnostic traffic to measure packet latency, loss rate and jitter between the EPC and the device. This traffic can be generated for specific EPS bearers as needed. In one embodiment the measurements can be achieved by using ICMP protocol, and monitoring round trip characteristics of IP packets generated by the ICMP applications. The Internet Control Message Protocol (ICMP) is a supporting protocol in the Internet protocol suite as defined. ICMP is used by network devices, including routers, to send error messages and operational information indicating success or failure when communicating with another IP address; for example, an error will be indicated when a requested service is not available or if a host or router could not be reached. ICMP differs from transport protocols such as TCP and UDP in that ICMP is not typically used to exchange data between systems, nor is it typically employed by end-user network applications.

In some embodiments, the following methods may be useful to monitor the KPIs:

The EPC assigns a different IP address for each bearer (default and dedicated bearers), and separately monitors each address;

Packets should be generated periodically by the EPC, e.g., the Packet Gateway (P-GW), at a certain frequency;

The specific frequency used in packet generation is a compromise between higher accuracy of the measurements versus extra load generated in the network; e.g., for Voice over IP (VoIP) traffic flow that typically has small packet sizes and packet interarrival time of 20 ms, a period of 100 ms can be used to create ICMP packets to monitor the bearer;

Packet sizes should be reasonably close to the IP packet sizes observed in the specific bearer whose performance is being monitored; and Special attention should be paid to impact of the diagnostic traffic on the performance of data compression algorithms such as ROHC for the ongoing data traffic.

These measurements would typically be round trip packet measurements and in that case the measurement would not give specific indication of downlink versus uplink performance. So if the measurements are round trip, for simplicity, KPIs can be assumed to be equally contributed by downlink and uplink traffic. The same method can also be used to measure the other KPIs.

For certain applications running over TCP/IP protocols, inspection of the TCP/IP packet headers of the ongoing data traffic can be used to measure the KPIs.

Round trip delay measurement: TCP ACK packet header (acknowledgment number field) indicates which specific TCP packet (sequence number field) is being acknowledged. Or TCP/IP header files such as ("TSval" ad TSecor") can be used to identify which specific TCP packet is acknowledged. Hence round-trip delay can be measured between the corresponding TCP packet and TCP ACK packet at EPC (by comparing the time stamp recorded from the original TCP packet with the corresponding ACK packet reception time). This operation can be performed both for downlink and uplink directions, giving a measurement of RTT between the EPC and UE, and between the EPC and application server.

Packet retransmission rate: TCP headers (sequence number field) can be used to get a measure of packet retransmission rate via detection of repeated sequence numbers. Also, TCP ACK packet headers (acknowledgment number field) can be utilized for same purpose. The operation can be done both for the downlink and uplink direction giving a measurement of packet retransmission rate between EPC and UE, and between EPC and application server.

For non-TCP/IP traffic: Artificial Intelligence (AI) techniques can be used to learn traffic patterns and associated KPIs such as packet latency, loss rate and jitter. For example, different multimedia applications may adjust traffic rate and packet sizes based on available throughput and packet error rate, or control the traffic associated with the application so that it has a certain behavior correlated with some of the network KPIs.

Also, if a PME 1040 (FIG. 10) is implemented, it may utilize any additional information that can be provided by the RAN and UE. For example, eNB (RAN)-provided performance metrics can include: 1) the achieved Packet Error Rate (PER) (MAC and RLC layer) for each bearer; and 2) PRB resource utilization for each bearer. UE-provided performance metrics can include: achieved PER (MAC, RLC and IP layer) for each bearer; and channel quality (SNR). Any of this information can be useful to help determine if the SLOs are being met.

(12) Load Control, Admission Control, and Alarms

As the number and amount of data flows increase and the LTE/5G system becomes more and more loaded, the KPIs will eventually show that performance is degrading. Degradation of performance may result from any of a number of factors, such as the load reached at the eNB, or limitations in the EPC or other parts of the system. If performance has degraded to a certain level, as observed by the KPIs, options are available to improve the system performance, including load control, admission control, and alarms, either individually or in combination.

The Performance Monitoring Engine (PME) 1040 preferably can update the current KPIs in real time, and provide the updated KPI values to an admission control function and a load control function for the RAN and EPC network, so that the current KPIs are available if and when needed. The current KPIs may include, or be sent with, an indication of a specific bearer, microslice, eNB and/or PSE associated with the KPI.

(13) Load Control

Figure 12:
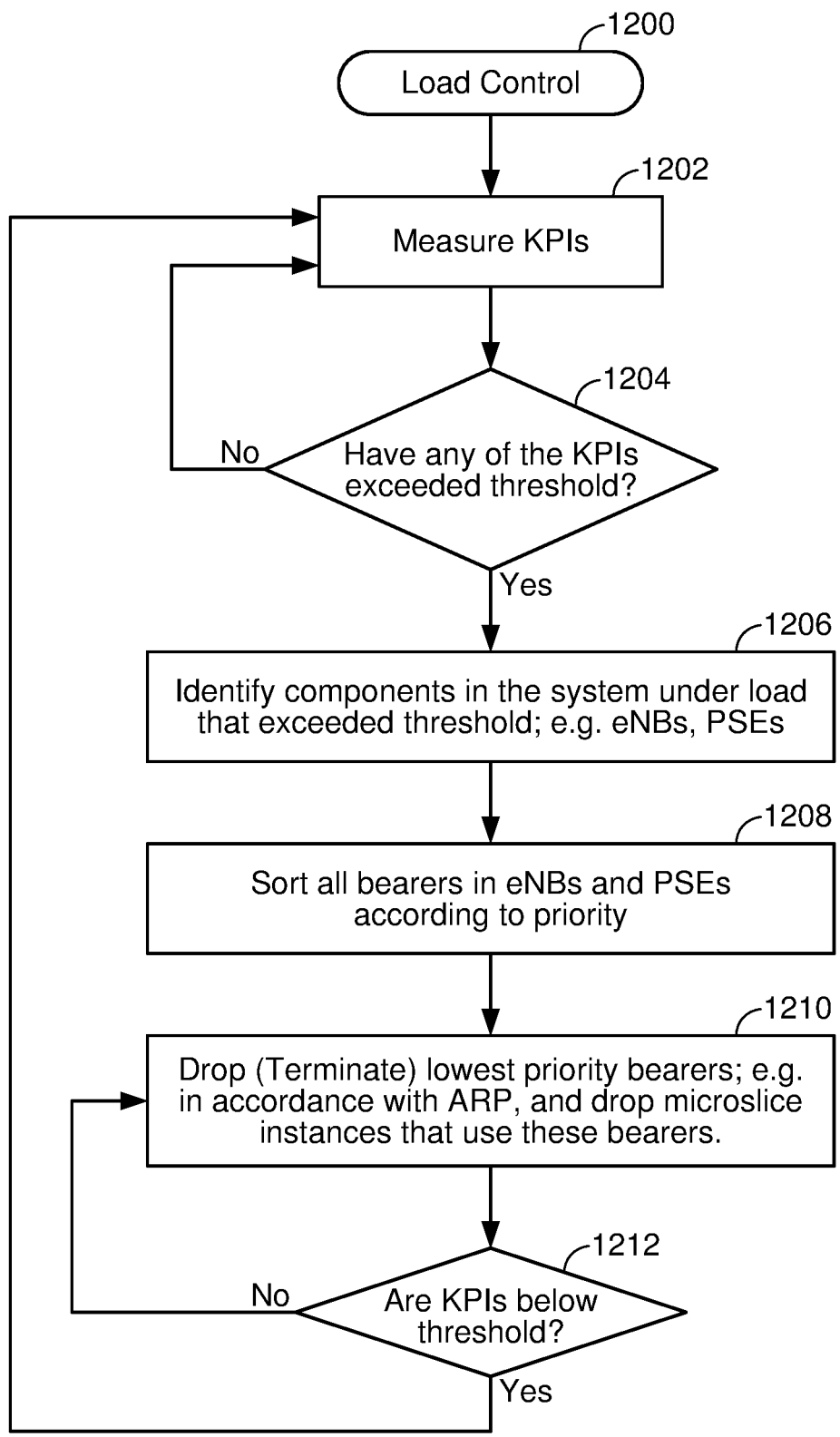
FIG. 12 is a flow chart of operations to provide load control in a system utilizing microslices.

If performance has degraded to a certain level as measured by the KPIs, one option is to perform load control operations, in which lower priority traffic is dropped (e.g. by the EPC) to accommodate traffic with higher priority. Reference is now made to FIG. 12 to illustrate a load control operation (STEP 1200). The KPIs are measured (STEP 1202), preferably continuously, and when any of the KPIs exceeds threshold (STEP 1204); e.g., if any specific KPI having index j (KPIj) passes a KPIj_load_control threshold (which may pre-determined responsive to the respective SLOs) for a specified period of time, the specific components in the service under load (e.g., eNBs, the PSEs) should be identified (STEP 1206). Using this information, all the bearers in the specific eNB and PSE may be sorted (STEP 1208) according to their priority, such as defined by their QCI. The lowest priority bearers should be dropped (STEP 1210), for example, in accordance with their Allocation and Retention Priority characteristics, until a decision is made (STEP 1212) that the KPIs, and particularly the specific KPIj under evaluation, satisfies the KPIj_load_control value. If a bearer in a microslice instance is dropped, then the microslice instance will be dropped; however the microslice (s) that utilize the bearers that are dropped can reconfigure, and utilize another set of bearers to create their microslice instance.

(14) Admission Control

Figure 13:
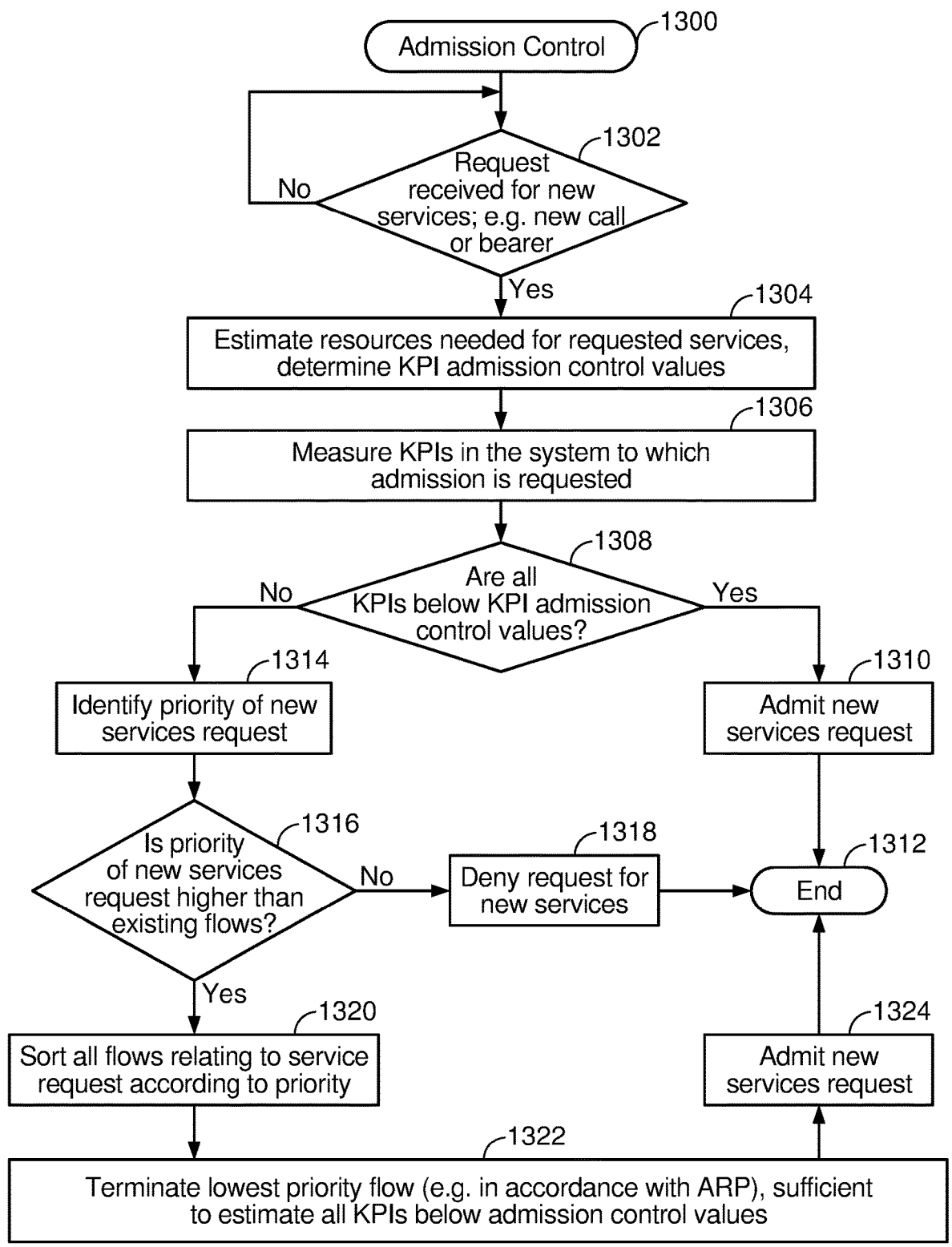
FIG. 13 is a flow chart of operations to provide admission control in a system utilizing microslices.

At a certain load, if performance has degraded to a certain level as measured by the KPIs, admission control operations may be performed, in which no more new calls and/or services will be admitted to the system, in order to keep the KPIs at the desired levels for all other UEs and other devices in the system. Reference is now made to FIG. 13, which is a flow chart that illustrates admission operations (STEP 1300). Operation remains in a waiting state (STEP 1302) until a request for new services (e.g., a new call or new bearer setup request) is received. After the new services request is received, the system estimates the resources needed for the new services, and then determines KPI admission control values (STEP 1308). The amount of resources needed for the incoming call be estimated based on microslice requirements and other sources, such as analysis of ongoing flows utilizing AI/ML (Artificial Intelligence/Machine Learning) techniques. This estimate, and any other useful information, can be used to determine KPI admission control values.

A determination is made (STEP 1308) to determine if all the KPIs are below the KPI admission control values; i.e., for index j, if all KPIjs are below the KPIj_admission_control values. If so then the new call or bearer can be admitted to the system (STEP 1310) and admission control operation ends. (STEP 1312) Otherwise, the system identifies the priority of the new services request (STEP 1314), and determines (STEP 1316) if the incoming request has a higher priority and has an ARP (Allocation and Retention Priority) that is above some of the existing flows in the eNB and the PSE desired for the new services. If the incoming request has a lower priority, then the request for new services is denied (STEP 1318), and operation ends (STEP 1312). However, if the incoming request has a higher priority, then the flows are sorted according to priority (STEP 1320) and lower priority flow(s) are terminated (dropped similar to load control section above) (STEP 1322) to create enough resources for the incoming services request. The new services request is then admitted (STEP 1324), and the admission control operation is complete (STEP 1324).

Note that, in addition to the KPI metrics, an eNB may have other metrics available to monitor and control load, such as the maximum number of RRC-Connected users allowed. These other metrics can also be used to perform admission control at the eNB level.

As with load control, if a bearer in a microslice instance is refused admission or dropped, then the microslice instance will be dropped; however the microslice(s) that utilize the bearers that are dropped can reconfigure, and utilize another set of bearers to create their microslice instance.

(15) Alarms and Control Procedures

Figure 14:
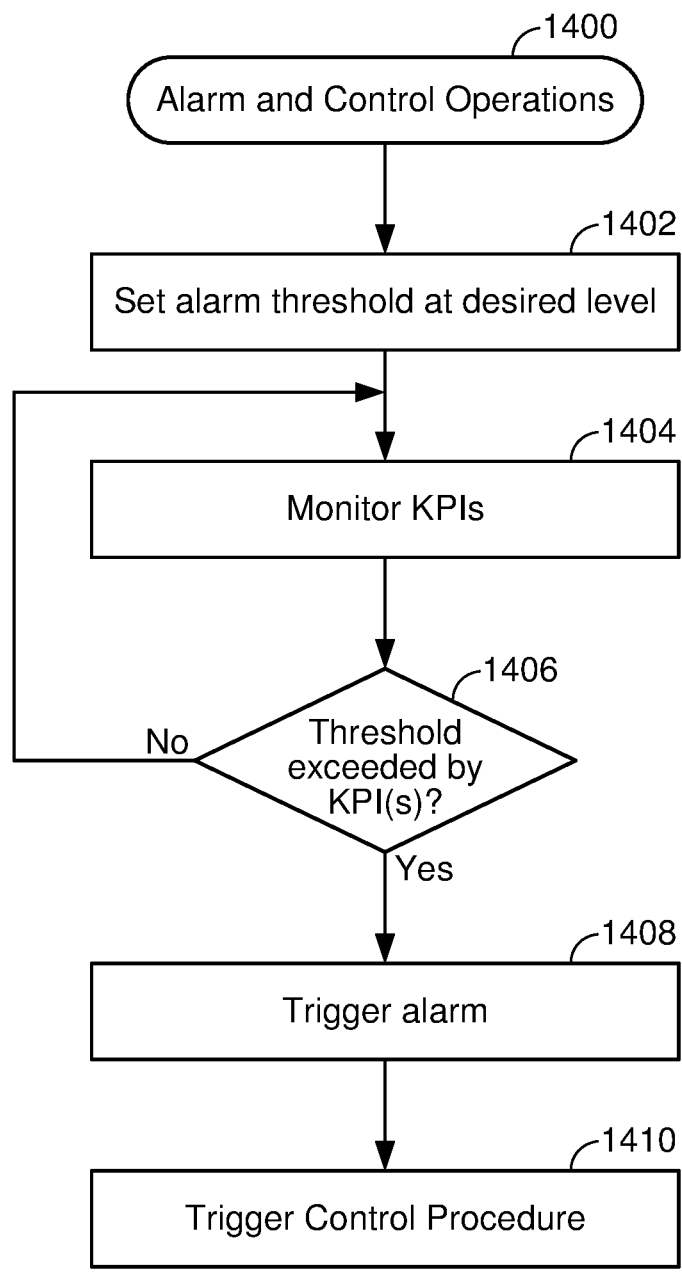
FIG. 14 is a flow chart of alarm operations that may be triggered under some circumstances, also showing a control procedure that may be run in response to triggering an alarm.

In a preferred embodiment, if it appears that an SLO may be exceeded, an alarm may be triggered, and/or a control procedure may be utilized. The alarm procedure may be used for any purpose, for example it may be used to alert a user or a system component of a current or impending problem, or it may be used to notify and trigger load control and/or admission control as described above. Reference is now made to FIG. 14, which describes Alarm and Control Operations (STEP 1400). A specific threshold for a particular alarm is set at a desired level (STEP 1402). In one embodiment these thresholds can be set to a certain value with respect to the maximum limit allowed by the SLOs. For example, a $KPIj\_admission\_control$ may trigger an alarm at 80% of the maximum allowed value and the $KPIj\_load\_control$ may trigger an alarm at 90% of the maximum allowed value for the $KPIj$, consistent with the SLOs.

The KPIs relevant to that alarm are monitored (STEP 1404). While KPIs remain below threshold, monitoring continues. (STEP 1406). However, if any of the KPIs is exceeded, an alarm is triggered (STEP 1408) (a $KPIj\_alarm$). The alarm may be provided to any interested entity, such as a network administrator, a system component, a bearer, the UE, the RAN, the EPC, or any other entity that for example has an interest in knowing that a particular bearer or system component or microslice instance is nearing its maximum allowed value.

If the alarm is designed to a trigger a control procedure, then the control procedure is triggered (STEP 1410). For example, a specific threshold may be set to trigger load control (a $KPIj\_load\_control$) procedure, and a specific threshold may be set to trigger an admission control (a $KPIj\_admission\_control$) procedure.

(16) LTE Bearers: LTE (4G) Architecture

As discussed in this document regarding setting up a microslice, one or more bearers are assigned to each microslice, to provide the data path for the microslice. The assigned bearers are then used to instantiate a microslice instance. As will be apparent to one skilled in the art, the bearers available in any particular network architecture may differ between embodiments. If the particular network architecture is defined by standards, then the bearers will be implemented according to those standards, and those bearers can be assigned to microslices.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of defining and using a microslice to efficiently arrange data flows and transmit data in an enterprise network that includes a Radio Access Network (RAN) and a Core Network (CN), to provide an end-to-end Quality of Service (QoS) for enterprise network communications between wireless user equipment (UE) and an external server, comprising:

defining a desired quality of service (QoS) by a network administrator for a service type, including defining QoS parameters;

defining a microslice by the network administrator, including defining Service Level Objectives (SLOs) for the microslice, responsive to the QoS parameters;
responsive to the QoS parameters, assigning at least one network bearer to the microslice, to provide a logical network between the UE and the external server, said logical network connecting the UE and external server through at least the Radio Access Network (RAN) and the Core Network; and
observing network communications with a UE to identify a service type, and if the identified service type matches the service type of the microslice, then assigning the matching microslice to a data flow to provide the defined QoS for the data flow;
responsive to the matched microslice, creating a microslice instance from the UE and through the at least one bearer assigned to the matched microslice;
creating the data flow over the microslice instance; and
monitoring and controlling the bearers in said microslice instance responsive to said SLOs.

2. The method of claim 1, further comprising creating the microslice instance through multiple bearers.

3. The method of claim 1, further comprising defining a predetermined amount of resources to be allocated to said microslice.

4. The method of claim 3, wherein defining a predetermined amount of resources includes at least one of: allocating a percentage of available resources, allocating an amount of airlink resources in terms of physical resource blocks (PRBs), allocating CPU resources, and allocating memory resources for said microslice.

5. The method of claim 3, wherein the network includes multiple CPUs, and defining a predetermined amount of resources includes allocating the microslice to one of said CPUs.

6. The method of claim 1, wherein defining a microslice further comprises associating a plurality of applications having that service type with the microslice.

7. The method of claim 6 further comprising
receiving a request for communication services;
identifying the application for which services are requested; and
creating a microslice instance if the identified application is one of the plurality of applications defined in the microslice.

8. The method of claim 6 further comprising identifying at least one of a service type and an application responsive to at least one of the following:
IP address of at least one of the server, destination, client or source;
Port number of at least one of the server, destination, client or source;
DiffServ differentiated services code point (DSCP) information;
Deep Packet Inspection (DPI) for URL/headers;
Artificial Intelligence (AI);
Machine Learning;
LTE/5G device dedicated bearer request;
DNS lookups;
Next Gen Firewall query;
SD-WAN information; and
API information.

9. The method of claim 1, wherein the Core Network is connected to a Wide Area Network (WAN), and the microslice is defined between the UE and the WAN, so that the WAN is part of the logical network connecting the UE and external server.

10. The method of claim 1, wherein a Local Area Network (LAN) is provided between the RAN and the Core Network, and the microslice is defined to include the LAN, so that the LAN is part of the logical network connecting the UE and external server.

11. The method of claim 10, wherein the LAN provides security features and ensures specific security and access control rules are met.

12. The method of claim 10, wherein the LAN ensures specific QoS and Service Level Objective (SLO) specifications are met.

13. A method of administering a plurality of UEs by a network administrator in an enterprise wireless network and efficiently controlling data flows between the UEs and External Servers, through at least a Radio Access Network (RAN) and a Core Network, comprising:
defining a device group including a first plurality of said UEs;
determining the QoS Parameters for said device group;
responsive to said QoS parameters, defining SLOs;
defining a microslice including said QoS parameters and said SLOs, and associating the microslice with said device group,
thereby providing a microslice with SLOs and QoS parameters for said device group;
assigning a group of bearers to the microslice, to provide a logical network between the UE and the external server, said logical network connecting the UE and external server through at least the Radio Access Network (RAN) and the Core Network (CN);
identifying network communications with a UE in said device group;
setting up and directing a data flow between said UE and the external server, including creating a microslice instance through said bearers responsive to the microslice associated with the device group; and
monitoring and controlling the bearers in the micro slice instance responsive to the SLOs and QoS parameters.

14. The method of claim 13 wherein at least two microslices are assigned to the device group.

15. The method of claim 13 wherein device group fields include a device group name, and at least one of an administrator name, a trusted/untrusted field, a VLAN ID, a VxLAN ID and a DHCP server address.

16. A method of efficiently controlling data flows between a plurality of UEs in an enterprise wireless network and at least one external server, the data flows going through at least a Radio Access Network (RAN) and a Core Network (CN) of the enterprise network, comprising the steps of:
defining a plurality of service types;
determining the QoS Parameters for each of said service types;
defining SLOs for each of said service types;
defining at least one device group by a network administrator of the enterprise network, the device group including a plurality of UEs;
defining a microslice for each of said service types by the network administrator, including associating said SLOs and QoS Parameters for each of said service types respectively to a microslice;
associating at least one device group with at least one of the microslices;
associating a group of bearers with each microslice, to provide a logical network between a UE having said service type and the external server, said logical network connecting said UE and external server through at least a Radio Access Network (RAN) and a Core Network (CN); and setting up and directing a data flow between one of said plurality of UEs in the device group and the external server responsive to network communications with the UE in the device group, including creating a microslice instance through said bearers responsive to the logical network defined in the microslice associated with the device group, and controlling the bearers in said microslice instance responsive to the SLOs and said QoS Parameters of the microslice.

\* \* \* \* \*